(12) United States Patent
Wakita et al.

(10) Patent No.: US 8,643,671 B2
(45) Date of Patent: Feb. 4, 2014

(54) INFORMATION PROCESSING APPARATUS, METHOD, AND COMPUTER-READABLE MEDIUM

(75) Inventors: Yoshihiro Wakita, Tokyo (JP); Shigeatsu Yoshioka, Kanagawa (JP); Naoki Tagami, Tokyo (JP)

(73) Assignee: Sony Corporation, Tokyo (JP)

( * ) Notice: Subject to any disclaimer, the term of this patent is extended or adjusted under 35 U.S.C. 154(b) by 500 days.

(21) Appl. No.: 12/940,301

(22) Filed: Nov. 5, 2010

(65) Prior Publication Data

US 2011/0128299 A1 Jun. 2, 2011

(30) Foreign Application Priority Data

Nov. 30, 2009 (JP) ................. 2009-272959

(51) Int. Cl.
*G05G 5/00* (2006.01)
(52) U.S. Cl.
USPC ........... 345/629; 345/619; 345/660; 345/662; 345/670; 345/671
(58) Field of Classification Search
None
See application file for complete search history.

(56) References Cited

U.S. PATENT DOCUMENTS

| 6,101,265 | A | 8/2000 | Bacus et al. |
| 6,266,453 | B1 | 7/2001 | Hibbard et al. |
| 2002/0070970 | A1 | 6/2002 | Wood et al. |
| 2003/0016850 | A1 | 1/2003 | Kaufman et al. |
| 2004/0167806 | A1 | 8/2004 | Eichhorn et al. |
| 2005/0270639 | A1 | 12/2005 | Miki |

FOREIGN PATENT DOCUMENTS

| JP | 01-224880 | 9/1989 |
| JP | 2003-529406 | 10/2003 |
| JP | 2004-354469 | 12/2004 |
| JP | 2005-331887 | 12/2005 |
| JP | 2006-095032 | 4/2006 |
| JP | 2009-037250 | 2/2009 |

OTHER PUBLICATIONS

European Search Report for Application No. EP 10 01 4903 dated May 6, 2011.
Japanese Patent Office, Grounds for refusal notice issued in connection with Japanese Patent Application No. 2009-272959, dasted Nov. 26, 2013. (3 pages).

*Primary Examiner* — Jwalant Amin
(74) *Attorney, Agent, or Firm* — K&L Gates LLP

(57) ABSTRACT

In one example embodiment, an information processing apparatus includes a display device which displays a first image associated with a first observation target object. The first image has a first display range. In one example embodiment, the display device displays a second image associated with a second observation target object. The second image has a second display range. In one example embodiment, the information processing apparatus enables a user to change the first display range of the first image. In response to the first display range being changed, the information processing apparatus simultaneously changes the second display range of the second image.

40 Claims, 16 Drawing Sheets

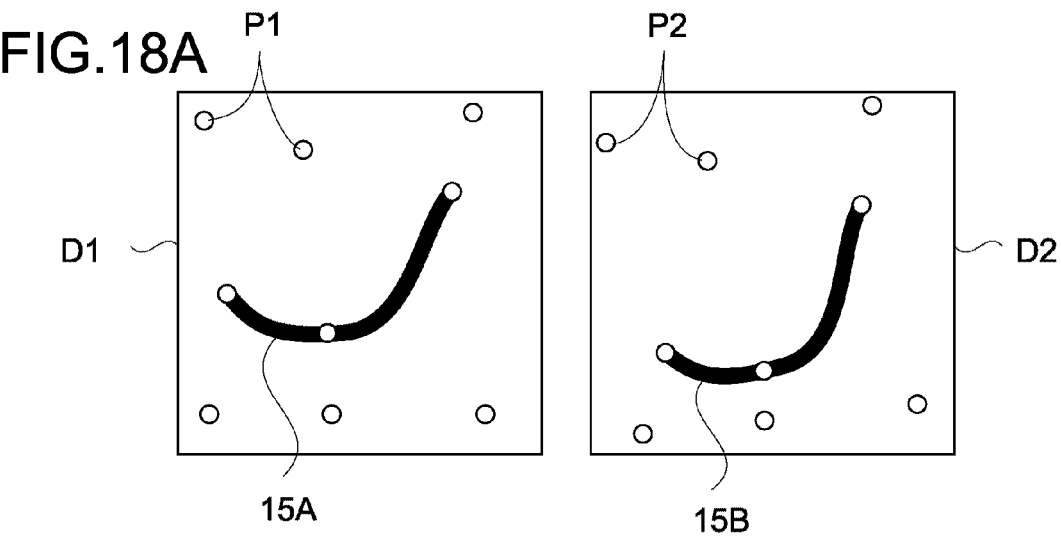
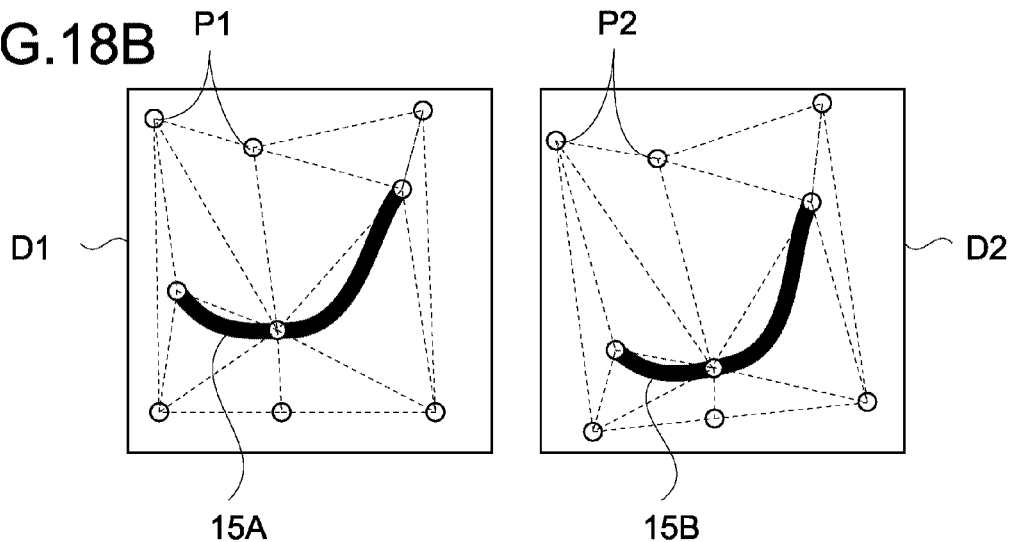
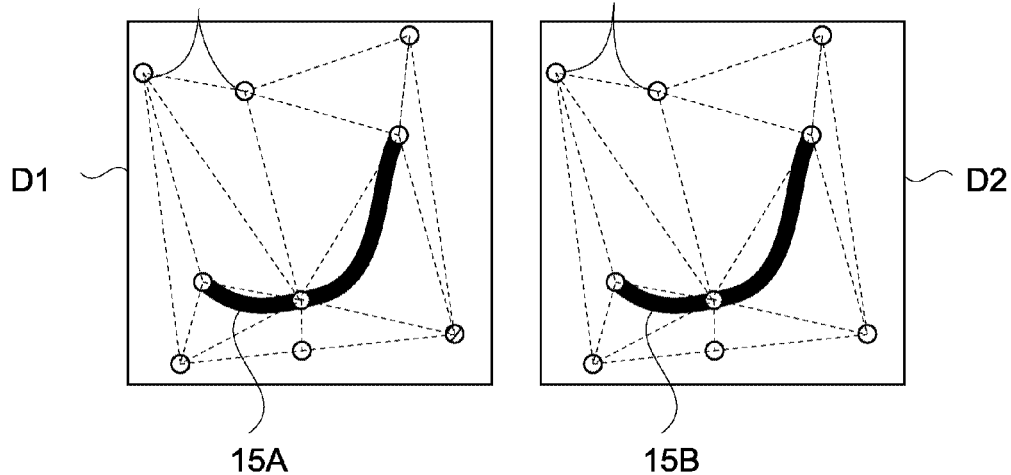

INFORMATION PROCESSING APPARATUS, METHOD, AND COMPUTER-READABLE MEDIUM

CROSS REFERENCES TO RELATED APPLICATIONS

The present application claims priority to Japanese Patent Application No. JP 2009-272959, filed in the Japanese Patent Office on Nov. 30, 2009 the entire contents of which is being incorporated herein by reference.

BACKGROUND

In a field of medicine, pathology, or the like, there has been proposed a system that digitizes an image of a cell, a tissue, an organ, or the like of a living body, that is obtained by an optical microscope, to examine the tissue or the like by a doctor or a pathologist or diagnose a patient based on the digitized image.

For example, Japanese Patent Application Laid-open No. 2009-37250 (hereinafter, referred to as Patent Document 1) discloses a method in which an image optically obtained by a microscope is digitized by a video camera with a CCD (charge coupled device), a digital signal is input to a control computer system, and the image is visualized on a monitor. A pathologist performs examination while watching the image displayed on the monitor (see, for example, paragraphs [0027] and [0028] and FIG. 5 of Patent Document 1).

In such systems, an image displayed on a monitor can be changed in accordance with an instruction of an operation made by a user using an input means such as a mouse. The "change" refers to, for example, movement, rotation, zoom-in, and zoom-out of a display range of the image. By those operations, the user can operate the image as if the user actually operated a microscope. Such systems include one in which two images are displayed in parallel with each other on one screen to be compared with each other by the user. The system changes an image to which an instruction is input in accordance with an instruction of an operation made by a user with respect to any one of the images. Here, in the case where the user wishes to apply the same change to the two images, the user needs to make an instruction of the same operation with respect to the respective images, which requires complicated operations.

In view of the circumstances as described above, there is a need for an information processing apparatus, a method, and a computer-readable medium which are capable of efficiently comparing two images by a user.

SUMMARY

The present disclosure relates to an information processing apparatus, a method, and a computer-readable medium for controlling display of an image obtained by a microscope in a field of medicine, pathology, biology, materials science, or the like.

In one example embodiment, an information processing apparatus includes a processor, a display device operatively coupled to the processor, an input device operatively coupled to the processor, and a memory device operatively coupled to the processor, the memory device storing instructions that cause the processor, in cooperation with the display device, the input device and the memory device, to: (a) display a first image associated with a first observation target object, the first image having a first display range; (b) display a second image associated with a second observation target object, the second image having a second display range; (c) enable a user to change the first display range; and (d) in response to the first display range being changed, simultaneously change the second display range.

In one example embodiment, the first observation target object is different from the second observation target object.

In one example embodiment, the first image corresponds to a first slice of the observation target object, and the second image corresponds to a second, different slice of the observation target object.

In one example embodiment, the first image has a first resolution, and the second image has a second, different resolution.

In one example embodiment, the instructions cause the processor to: (a) enable the user to change the first display range to a third display range; and (b) in response to the first display range being changed, simultaneously change the second display range to a fourth display range.

In one example embodiment, the instructions cause the processor to: (a) enable the user to change the second display range; and in response to the second display range being changed, cause the first display range to remain unchanged.

In one example embodiment, the instructions cause the processor to: (a) change at least a portion of the first image to a first color; and (b) change at least a portion of the second image to a second, different color.

In one example embodiment, the instructions cause the processor to operate with the input device to enable the user to: (a) for the first image, input a first annotation; and (b) for the second image, input a second, different annotation.

In one example embodiment, the instructions cause the processor to form a superimposed image by displaying a third image overlaying the first image. In this example embodiment, the third image: (a) has a fifth display range; (b) is associated with the second observation target image; and (c) corresponds to the second image.

In one example embodiment, the instructions cause the processor to operate with the input device to: (a) enable the user to simultaneously change the first display range and the fifth display range; and (b) in response to the first display range and the fifth display range being changed, simultaneously change the second display range.

In one example embodiment, the instructions cause the processor to operate with the input device to: (a) enable the user to change the second display range; and (b) in response to the second display range being changed: (i) simultaneously change the fifth display range; and (ii) cause the first display range to remain unchanged.

In one example embodiment, the first image has a first portion and is set as a first translucent image. In this example embodiment, the third image has a second portion and is set as a second translucent image. In this example embodiment, the instructions cause the processor to simultaneously display the first portion and the second portion such that the first portion and the second portion can each be visually identified.

In one example embodiment, the instructions cause the processor to operate with the input device to: (a) for the displayed first image, enable the user to set first control points; (b) for the displayed second image, enable the user to set second control points, wherein the second control points correspond to the first control points; and (c) cause a first shape of the first control points to coincide with a second shape of the second control points by performing affine transformation.

In one example embodiment, a method of operating an information processing apparatus including instructions includes: (a) causing a display device to display a first image associated with a first observation target object, the first image having a first display range; (b) causing the display device to display a second image associated with a second observation target object, the second image having a second display range; (c) causing a processor to execute the instructions to operate with an input device to enable a user to change the first display range; and (d) in response to the first display range being changed, causing the processor to execute the instructions to simultaneously change the second display range.

In one example embodiment, the method includes: (a) causing the processor to execute the instructions to operate with the input device to enable the user to change the first display range to a third display range; and (b) in response to the first display range being changed, causing the processor to execute the instructions to simultaneously change the second display range to a fourth display range.

In one example embodiment, the method includes: (a) causing the processor to execute the instructions to operate with the input device to enable the user to change the second display range; and (b) in response to the second display range being changed, causing the processor to execute the instructions to cause the first display range to remain unchanged.

In one example embodiment, the method includes: (a) causing the processor to execute the instructions to change at least a portion of the first image to a first color; and (b) causing the processor to execute the instructions to change at least a portion of the second image to a second, different color.

In one example embodiment, the method includes causing the processor to execute the instructions to operate with the display device to form a superimposed image by displaying a third image overlaying the first image. In this example embodiment, the third image: (a) has a fifth display range; (b) is associated with the second observation target image; and (c) corresponds to the second image.

In one example embodiment, the method includes: (a) causing the processor to execute the instructions to operate with the input device to enable the user to simultaneously change the first display range and the fifth display range; and (b) in response to the first display range and the fifth display range being changed, causing the processor to execute the instructions to operate with the display device to simultaneously change the second display range.

In one example embodiment, the method includes: (a) causing the processor to execute the instructions to operate with the input device to operate with the input device to enable the user to change the second display range; and (b) in response to the second display range being changed: (i) causing the processor to execute the instructions to simultaneously change the fifth display range; and (ii) causing the processor to execute the instructions to cause the first display range to remain unchanged.

In one example embodiment, the method includes: (a) causing the processor to execute the instructions to set the first image as a first translucent image, the first image having a first portion; (b) causing the processor to execute the instructions to set the third image as a second translucent image, the third image having a second portion; and (c) causing the processor to execute the instructions to operate with the display device to simultaneously display the first portion and the second portion such that the first portion and the second portion can each be visually identified.

In one example embodiment, a computer-readable medium stores instructions structured to cause an information processing apparatus to: (a) display a first image associated with a first observation target object, the first image having a first display range; (b) display a second image associated with a second observation target object, the second image having a second display range; (c) enable a user to change the first display range; and (d) in response to the first display range being changed, simultaneously change the second display range.

As described above, according to the embodiments of the present disclosure, it is possible to provide an information processing apparatus, a method, and a computer-readable medium which are capable of efficiently comparing two images by a user.

Additional features and advantages are described herein, and will be apparent from the following Detailed Description and the figures.

BRIEF DESCRIPTION OF THE FIGURES

FIGS. 18A, 18B and 18C are schematic diagrams each showing a state of an affine transformation on two display images in a sixth embodiment.

DETAILED DESCRIPTION

Hereinafter, example embodiments of the present disclosure will be described with reference to the drawings.

[First Example Embodiment]

[Structure of Information Processing Apparatus]

Figure 1:
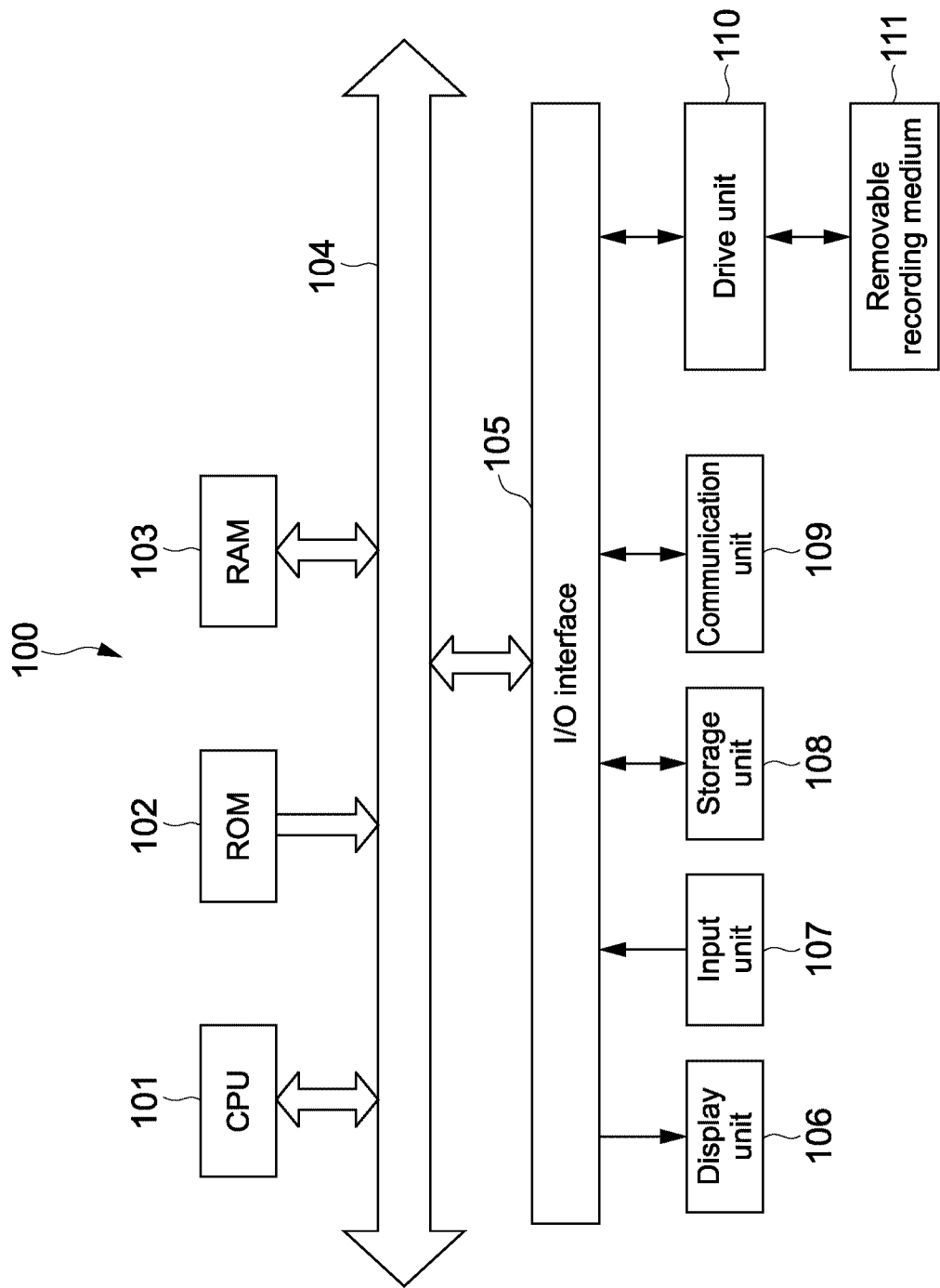
FIG. 1 is a block diagram showing the structure of an example computer system including an information processing apparatus according to a first example embodiment.

FIG. 1 is a block diagram showing the structure of an example computer system including an information processing apparatus according to an example embodiment of the present disclosure. As the information processing apparatus, a PC (personal computer) 100 is used, for example.

The PC 100 includes a CPU (central processing unit) 101, a ROM (read only memory) 102, a RAM (random access memory) 103, an input and output interface (hereinafter, abbreviated as I/O interface) 105, and a bus 104 that connects those components with one another.

To the I/O interface 105, a display unit 106, an input unit 107, a storage unit 108, a communication unit 109, a drive unit 110, and the like are connected.

The display unit 106 is a display device that uses liquid crystal, EL (electro-luminescence), a CRT (cathode ray tube), or the like.

The input unit 107 is, for example, a pointing device, a keyboard, a touch panel, or another operation apparatus. In the case where the input unit 107 includes a touch panel, the touch panel may be integrated with the display unit 106.

The storage unit 108 is a non-volatile memory such as an HDD (hard disk drive), a flash memory, and another solid-state memory.

The drive unit 110 is a device capable of driving a removable recording medium 111 such as an optical recording medium, a floppy (registered trademark) disk, a magnetic recording tape, and a flash memory. In contrast, the storage unit 108 is often used as a device that is previously included in the PC 100 and mainly drives a recording medium that is not removable.

The communication unit 109 is a modem, a router, or another communication apparatus that is connectable to a LAN (local area network), a WAN (wide area network), or the like and is used for communicating with another device. The communication unit 109 may perform one of a wired communication or a wireless communication. The communication unit 109 is used separately from the PC 100 in many cases.

[Image Pyramid Structure]

The information processing apparatus (PC 100) of this example embodiment generates an image pyramid structure based on an image of an observation target, which is captured by an imaging apparatus. Hereinafter, the image pyramid structure will be described.

Figure 2:
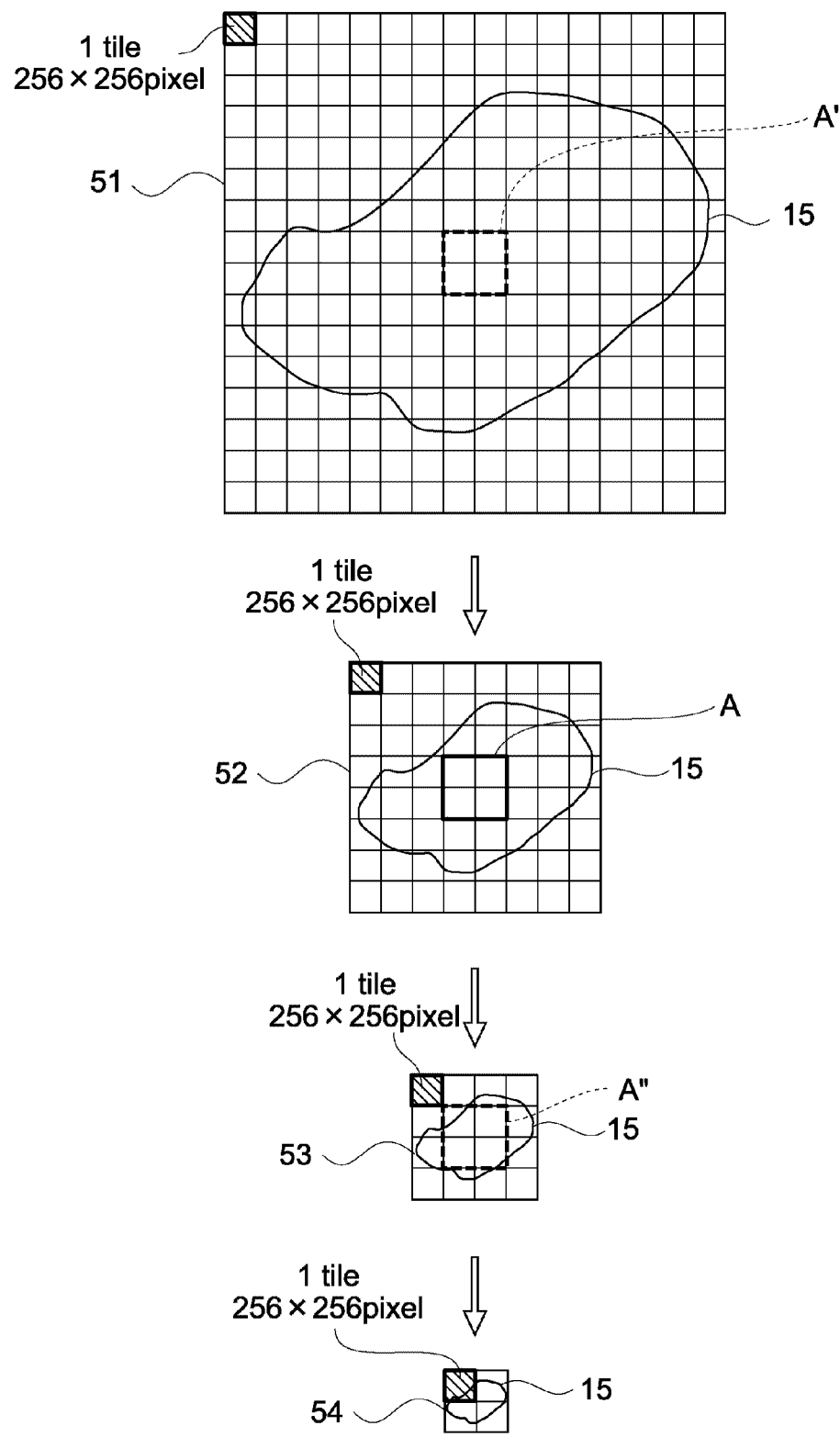
FIG. 2 is a schematic diagram for explaining an example procedure used when an image group of an image pyramid structure is generated.
Figure 3:
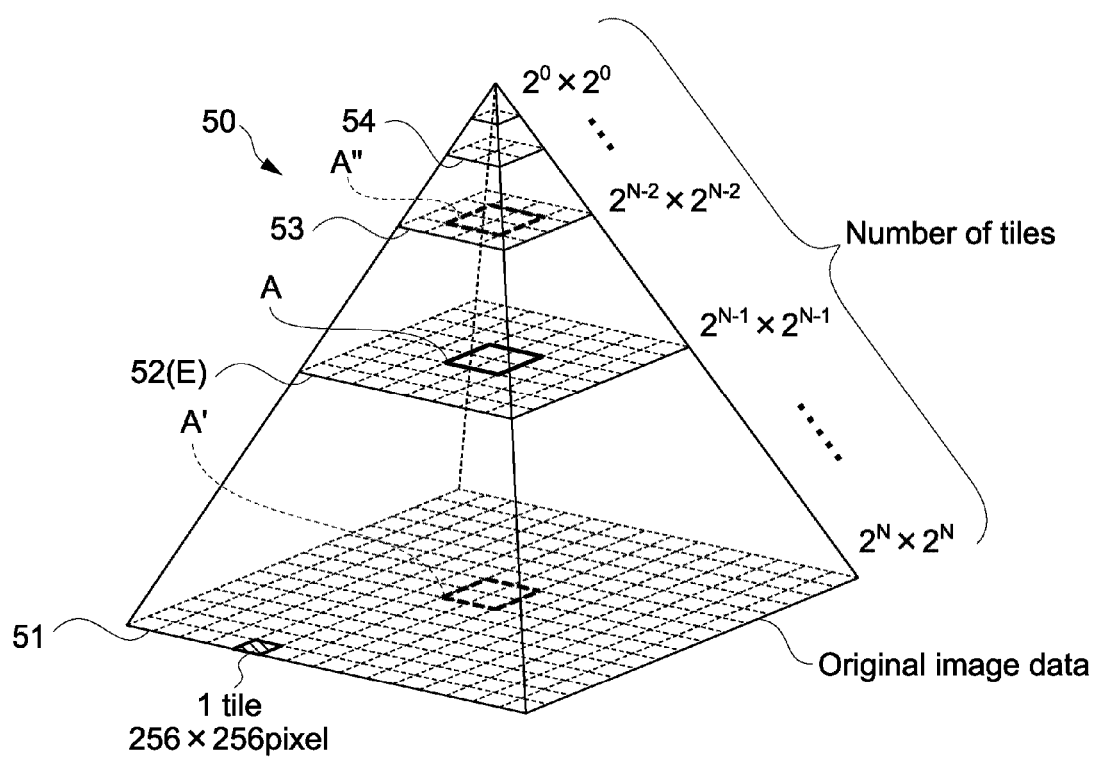
FIG. 3 is a conceptual diagram showing an example image pyramid structure.

FIG. 2 is a diagram for explaining an example procedure used when an image group of the image pyramid structure is generated. FIG. 3 is a conceptual diagram showing an example image pyramid structure 50 that is generated.

First, an image of an observation target 15 is captured by a scanner apparatus (not shown) and digital image data is generated. In the field of pathology, generally, a matter obtained by slicing an organ, a tissue, or a cell of a living body, or a part thereof is an observation target 15. Then, the scanner apparatus having a function of an optical microscope captures an image of the observation target 15 set on a glass slide, to store digital image data thus obtained into the scanner apparatus or another storage apparatus. Since this digital image data is to be an original image data 51 having the highest magnification in the image pyramid structure, so the digital image data is captured at a sufficiently high magnification.

The scanner apparatus or a general-purpose computer (not shown) generates, from the original image data 51 obtained as described above, image data items whose resolutions are reduced stepwise as shown in FIG. 2. FIG. 2 shows image data contracted from the original image data 51 as image data 52, image data further contracted from the image data 52 as image data 53, and image data further contracted from the image data 53 as image data 54. It should be noted that in actuality, the resolutions are reduced in a larger number of steps and a larger number of image data items are generated. The imaging apparatus or the general-purpose computer stores those image data items in unit of "tile" that is a unit of a predetermined size, for example. The size of one tile is 256×256 (pixel), for example.

The image data items thus generated forms the image pyramid structure 50 shown in FIG. 3, and are stored in the storage unit 108 or the like of the information processing apparatus, for example. Actually, those image data items only have to be stored while being associated with resolution information items. It should be noted that the generating and storing of the image pyramid structure 50 may be performed by the information processing apparatus of this example embodiment, and the image pyramid structure 50 hereinafter represents an image pyramid structure 50 generated from one original image data.

The information processing apparatus acquires an image of a target position and resolution from the image pyramid structure 50 in accordance with an instruction made by a user, and displays the image on the display unit 106. Hereinafter, the principle of displaying an image will be described.

First, the CPU 101 in the information processing apparatus receives an input to designate a resolution from the user via the input unit 107. In response to the instruction, the CPU 101 acquires image data E of the designated resolution from the image pyramid structure 50 stored in the storage unit 108, and sets a predetermined display area A with respect to the image data E. Then, a portion of the image data E that corresponds to the display area A is referred to as a "display image".

In FIG. 3, the image data 52 is the image data E. The display area A is a virtual area to define a display image, which is handled by the CPU 101, and is set as a partial area on the image data E. Part of the image data E that corresponds to the display area A is displayed as a display image on the display unit 106. The size of the display area A is determined by the number of pixels and is not changed even when an image resolution to be set is changed.

In the case where the user wishes to change a display range of the display image, the user inputs an instruction to change the display range to the information processing apparatus via the input unit 107. The display range refers to a range of the original image data that is to be displayed on a physical screen. Here, the cases where the changes instructed by the user are movement, enlargement (zoom-in), contraction (zoom-out), and rotation of the display range of the display image will be described.

In the case where the user wishes to move the display range of the display image, the user inputs a desired movement distance and movement direction to the information processing apparatus by the input unit 107. The CPU 101 moves the display area A in the instructed movement distance and movement direction on the image data E, and displays part of the image data E that corresponds to the moved display area A, as a new display image, on the display unit 106.

In the case where the user wishes to rotate the display range of the display image, the user inputs desired rotation center coordinates and a desired rotation angle to the information processing apparatus by the input unit 107. The CPU 101 rotates the display area A about the instructed rotation center coordinates on the image data E by the instructed rotation angle, and displays part of the image data E that correspond to the rotated display area A, as a new display image, on the display unit 106.

In the case where the user wishes to enlarge the display range of the display image, that is, zoom in the display image, the user inputs enlargement center coordinates and an enlargement magnification of the display image to the information processing apparatus by the input unit 107. In the image pyramid structure 50, the CPU 101 moves the display area A on image data of a higher resolution (for example, image data 51) that corresponds to the instructed enlargement magnification. In this case, a position on the image data of the higher resolution, which corresponds to the enlargement center coordinates instructed on the image data E, is set as enlargement center coordinates of the image data of the higher resolution and a position of the display area A is set with those enlargement center coordinates as the center. Further, since only the resolution of the image data is increased with the size of the display area A being fixed in this case, the display image is zoomed in. It should be noted that FIGS. 2 and 3 each show a display area A', which is the display area obtained when the display image is zoomed in.

In the case where the user wishes to contract the display range of the display image, that is, zoom out the display image, the user inputs contraction center coordinates and a contraction magnification of the display image to the information processing apparatus by the input unit 107. In the image pyramid structure 50, the CPU 101 moves the display area A on image data of a lower resolution (for example, image data 53) that corresponds to the instructed contraction magnification. In this case, a position on the image data of the lower resolution, which corresponds to the contraction center coordinates instructed on the image data E, is set as contraction center coordinates of the image data of the lower resolution and a position of the display area A is set with those contraction center coordinates as the center. Further, since only the resolution of the image data is reduced with the size of the display area A being fixed in this case, the display image is zoomed out. It should be noted that FIGS. 2 and 3 each show a display area A", which is the display area obtained when the display image is zoomed out.

As described above, the image of the observation target 15 is displayed on the display unit 106 by the information processing apparatus, and in accordance with change instructions such as movement, rotation, enlargement, and contraction that are made by the user with respect to the displayed observation target 15, the change processing is executed. Hereinafter, the changes as described above are collectively referred to as "change in angle of view with respect to display area A".

[Operation of the Example Information Processing Apparatus According to the First Example Embodiment]

Figure 4A:
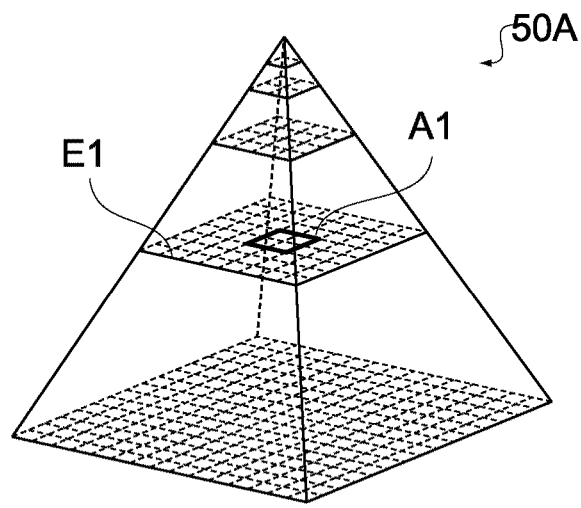
FIGS. 4A and 4B are conceptual diagrams showing two example image pyramid structures.
Figure 4B:
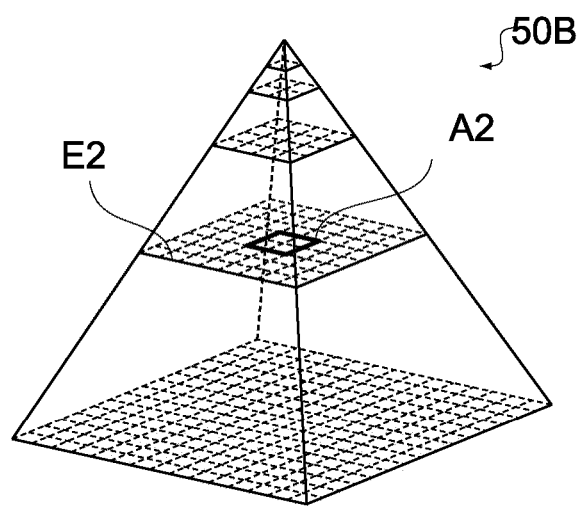

Hereinafter, an operation of the example information processing apparatus according to this example embodiment will be described. The information processing apparatus according to this example embodiment enables comparison between two images by the user. The two images are images extracted from two respective image pyramid structures 50 that are obtained by capturing images of two respective observation targets 15 having high spatial similarity. The two observation targets 15 are, for example, out of a plurality of slices obtained by slicing a pathological tissue, adjacent two slices stained by different staining methods. FIG. 4 are conceptual diagrams showing the two image pyramid structures 50 to be compared by the user. Here, one of the image pyramid structures 50 is referred to as an "image pyramid structure 50A", and the other one is referred to as an "image pyramid structure 50B". It should be noted that the image pyramid structure 50A and the image pyramid structure 50B may be generated from so-called Z-stack images that are obtained by capturing images of one observation target object while changing a focal length.

[Display of Two Images in the First Example Embodiment]

When the user inputs an instruction of display of two images and a desired resolution, the CPU 101 sets a display area A1 with respect to image data E1 of the image pyramid structure 50A and also sets a display area A2 with respect to image data E2 of the image pyramid structure 50B. A size of the display area A1 is the same as that of the display area A2, and a position of the image data E1 is the same as that of the image data E2. The CPU 101 assumes that a portion of the image data E1 that corresponds to the display area A1 is a display image D1 (first image) and a portion of the image data E2 that corresponds to the display area A2 is a display image D2 (second image).

Figure 5:
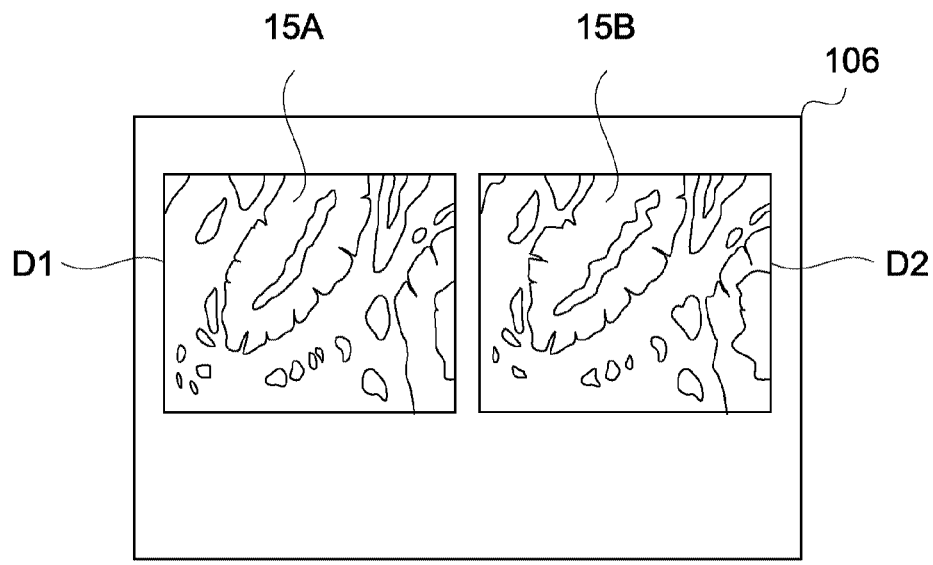
FIG. 5 is a schematic diagram showing an example display unit in the first example embodiment.

FIG. 5 is a schematic diagram showing the display unit 106. The CPU 101 develops the display image D1 and the display image D2 on a display buffer that is set in the RAM 103. As a result, the display image D1 and the display image D2 are displayed on a display screen of the display unit 106. The display image D1 and the display image D2 are displayed in parallel with each other, e.g., laterally on the display screen of the display unit 106. Hereinafter, the observation target 15 displayed in the display image D1, that is, the observation target of the image pyramid structure 50A is assumed to be a first observation target 15A, whereas the observation target 15 displayed in the display image D2, that is, the observation target of the image pyramid structure 50B is assumed to be a second observation target 15B.

As described above, the display image D1 and the display image D2 are displayed on the display unit 106, thus enabling the comparison therebetween by the user.

[Change Instruction of the Display Range Made by User in the First Example Embodiment]

Here, the change in display range will be described. Assuming that a mouse is used as the input unit 107, in the case where the user wishes to change display ranges of the display image D1 and the display image D2, the user inputs an instruction of a change in display range to the information processing apparatus via the mouse (input unit 107). For example, when the mouse is dragged in a state where a mouse cursor is put on the display image D1, the CPU 101 receives an input of an instruction to change the display range of the display image D1. Similarly, when the mouse is dragged in a state where the mouse cursor is put on the display image D2, the CPU 101 receives an input of an instruction to change the display range of the display image D2.

In this example embodiment, the display range of the display image D1 and the display range of the display image D2 are changed in conjunction with each other. Specifically, along with an instruction to change the display range of one of the display images D1 and D2, the same change is automatically executed on the display range of the other display image. As a result, the user does not need to separately change the display ranges of the display image D1 and the display image D2, and can efficiently compare the display image D1 with the display image D2.

[Functional Structure of the Example Information Processing Apparatus According to the First Example Embodiment]

Figure 6:
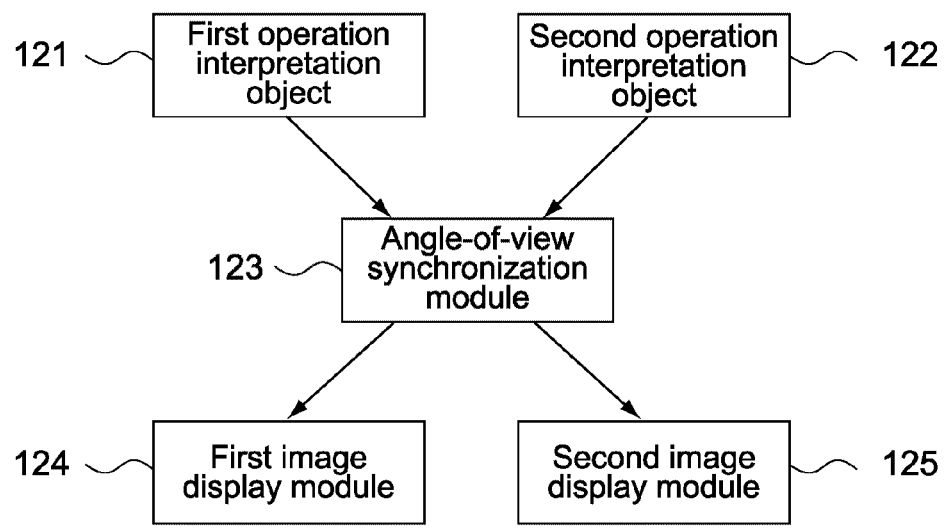
FIG. 6 is a block diagram showing an example functional structure (program structure) of a processing unit according to the first example embodiment.

FIG. 6 is a block diagram showing a functional structure of a processing unit (image processing unit) that performs change processing on the display image D1 and the display image D2 in the information processing apparatus of this example embodiment. As shown in FIG. 6, the processing unit (image processing unit) includes a first operation interpretation object 121, a second operation interpretation object 122, an angle-of-view synchronization module 123, a first image display module 124, and a second image display module 125 that are stored in the ROM 102, the storage unit 108, or the like and operate when read by the CPU 101.

The first operation interpretation object 121 generates a "request to change an angle of view" based on an instruction to change the display image D1 that is one of the two images displayed in parallel, the instruction being input by the user via the input unit 107, and supplies the request to the angle-of-view synchronization module 123. It should be noted that the "request to change an angle of view" is information input by a change instruction, e.g., a command including information of a movement direction, a movement distance, and the like.

The second operation interpretation object 122 generates a "request to change an angle of view" based on an instruction to change the display image D2 that is the other one of the two images displayed in parallel, the instruction being input by the user via the input unit 107, and supplies the request to the angle-of-view synchronization module 123.

The angle-of-view synchronization module 123 synchronously supplies the request to change an angle of view, which has been supplied from one of the first operation interpretation object 121 and the second operation interpretation object 122, to the first image display module 124 and the second image display module 125. It should be noted that the "object" and the "module" refer to portions each having a specific function in a program.

The first image display module 124 changes an angle of view with respect to the display area A1 of the image pyramid structure 50A based on the request to change an angle of view, which has been supplied from the angle-of-view synchronization module 123.

The second image display module 125 changes an angle of view with respect to the display area A2 of the image pyramid structure 50B based on the request to change an angle of view, which has been supplied from the angle-of-view synchronization module 123.

[Operation of Changing an Angle of View in the First Example Embodiment]

The operation of the functional structure in the case where the user inputs a change instruction with respect to the display image D1 will be described.

When the user inputs a change instruction with respect to the display image D1 by using the input unit 107, the CPU 101 performs the following control based on the functional structure described above. Specifically, first, the first operation interpretation object 121 generates a request to change an angle of view based on the change instruction input by the user and supplies the request to the angle-of-view synchronization module 123.

The angle-of-view synchronization module 123 supplies the request to change an angle of view to the first image display module 124 and the second image display module 125. The first image display module 124 changes an angle of view with respect to the display area A1 of the image pyramid structure 50A based on the request to change an angle of view that has been supplied from the angle-of-view synchronization module 123. The second image display module 125 changes an angle of view with respect to the display area A2 of the image pyramid structure 50B based on the request to change an angle of view that has been supplied from the angle-of-view synchronization module 123. The first image display module 124 and the second image display module 125 are supplied with the same request to change an angle of view, with the result that the display range of the display image D1 and that of the display image D2 are changed in the same manner.

As described above, based on the change instruction with respect to the display image D1, the display range of the display image D1 and the display range of the display image D2 are changed in conjunction with each other.

The case where the user inputs a change instruction with respect to the display image D2 is similar to the case where the change instruction with respect to the display image D1 is input. Specifically, when the user inputs a change instruction with respect to the display image D2, a request to change an angle of view is generated by the second operation interpretation object 122. The request to change an angle of view is supplied to the first image display module 124 and the second image display module 125 via the angle-of-view synchronization module 123, and the display range of the display image D2 and the display range of the display image D1 are changed in conjunction with each other.

Figure 7A:
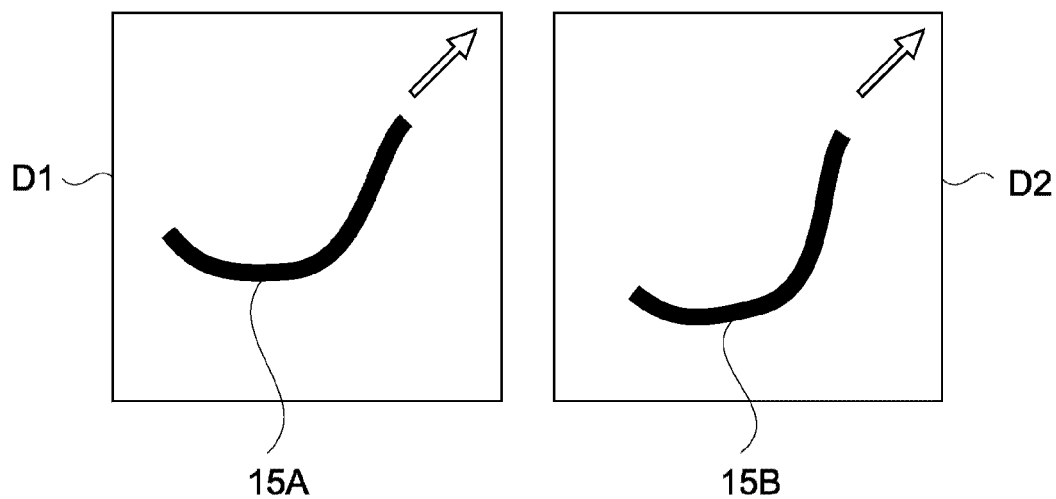
FIGS. 7A and 7B are schematic diagrams each showing changed states of example display ranges of two display images in the first example embodiment.
Figure 7B:
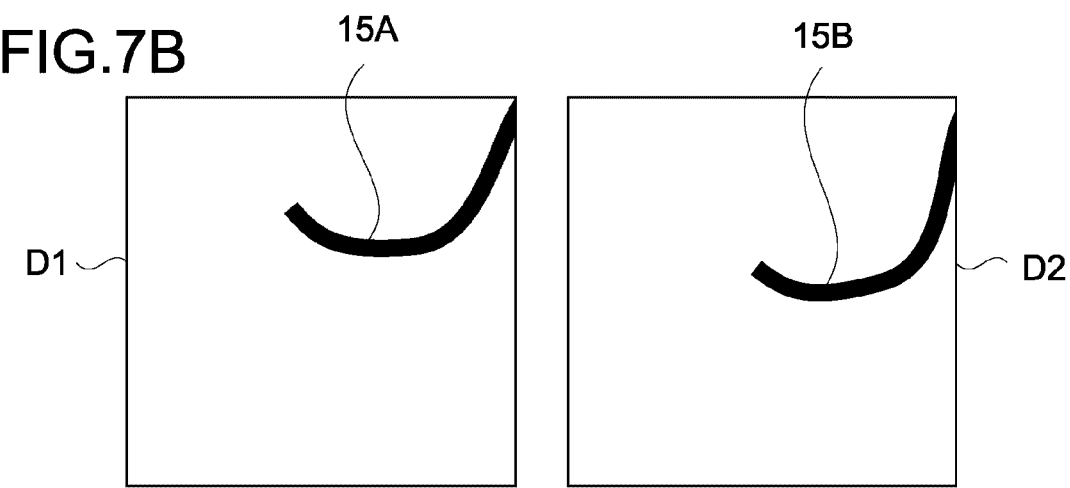

FIG. 7 are schematic diagrams each showing changed states of the display ranges of the display image D1 and the display image D2. FIG. 7A shows the display image D1 and the display image D2 whose display ranges are not changed. FIG. 7B shows the display image D1 and the display image D2 whose display ranges are changed. It should be noted that for easy understanding, FIG. 7A and FIG. 7B show a simplified first observation target 15A and a simplified second observation target 15B, respectively. Subsequent figures are also simplified.

In the display image D1 and the display image D2 shown in FIG. 7A, when a change instruction is given to the display image D1 or the display image D2, the display range of the display image D1 and that of the display image D2 are similarly changed as indicated by arrows, with the result that the display image D1 and the display image D2 shown in FIG. 7B are displayed. It should be noted that in this case, the change instruction with respect to the display image D1 is a movement toward an upper right direction in the figure.

As described above, according to this example embodiment, by inputting a change instruction with respect to one of the display image D1 and the display image D2 to the information processing apparatus, the user can simultaneously change the display range of the display image D1 and that of the display image D2, with the result that the display image D1 and the display image D2 can be efficiently compared with each other.

The instruction of a spatial change with respect to the display image D1 and the display image D2, the instruction being input by the user, may be stored separately from the image pyramid structure 50A and the image pyramid structure 50B, and given and received via a removable recording medium or a network connected to the information processing apparatus. The CPU 101 can change the display image D1 and the display image D2 based on the given and received instruction of a spatial change. With this structure, another user does not need an input operation of parameters separately. It should be noted that the network or removable recording medium is equivalent to a first giving and receiving unit.

[Second Example Embodiment]

A second example embodiment of the present disclosure will be described. In the second example embodiment, descriptions of portions that are similar to those in the first example embodiment will be omitted. The display image D1 and the display image D2 that are obtained as in the first example embodiment are also compared with each other in the second example embodiment, but a mode of changing display ranges in the second example embodiment is different from that in the first example embodiment. Hereinafter, the change in display range will be described.

An information processing apparatus of this example embodiment changes a display range of the display image D1 and that of the display image D2 in response to a change instruction made by the user with respect to the display image D1, and changes only the display range of the display image D2 in response to a change instruction with respect to the display image D2. As a result, a user does not need to change the display ranges of the display image D1 and the display image D2 separately. Further, a position of the display range of the display image D2 can be independently corrected in accordance with a position of the display range of the display image D1.

[Functional Structure of an Example Information Processing Apparatus According to the Second Example Embodiment]

Figure 8:
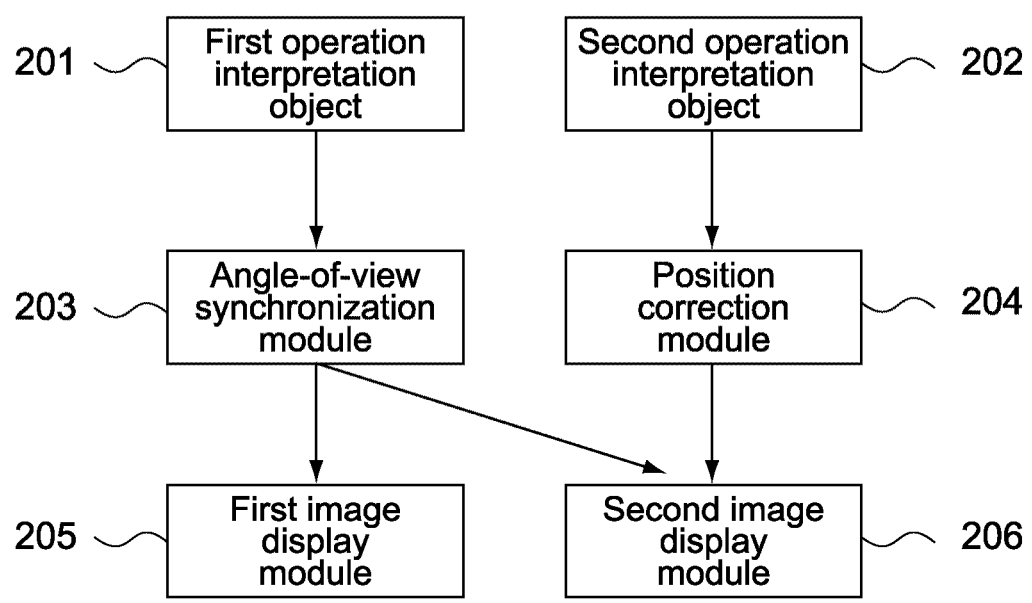
FIG. 8 is a block diagram showing an example functional structure (program structure) of a processing unit according to a second example embodiment.

FIG. 8 is a block diagram showing an example functional structure of a processing unit (image processing unit) that performs change processing on the display image D1 and the display image D2 in the example information processing apparatus of this example embodiment.

As shown in FIG. 8, the processing unit (image processing unit) includes a first operation interpretation object 201, a second operation interpretation object 202, an angle-of-view synchronization module 203, a position correction module 204, a first image display module 205, and a second image display module 206 that are stored in the ROM 102, the storage unit 108, or the like and operate when read by the CPU 101. The first operation interpretation object 201 and the first image display module 205 have the same structure as in the first example embodiment.

The second operation interpretation object 202 generates a request for position correction with respect to the display image D2 that is one of the two images displayed in parallel, based on a change instruction input by the user via the input unit 107, and supplies the request to the position correction module 204. The request for position correction is substantially the same as the request to change an angle of view.

The angle-of-view synchronization module 203 synchronously supplies the request to change an angle of view, which has been supplied from the first operation interpretation object 201, to the first image display module 205 and the second image display module 206.

The position correction module 204 supplies the request for position correction, which has been supplied from the second operation interpretation object 202, to the second image display module 206.

The second image display module 206 changes an angle of view with respect to the display area A2 of the image pyramid structure 50B based on the request to change an angle of view that has been supplied from the angle-of-view synchronization module 203, and changes an angle of view with respect to the display area A2 of the image pyramid structure 50B based on the request for position correction that has been supplied from the position correction module 204.

[Operation of Changing an Angle of View in the Second Example Embodiment]

The case where the user inputs a change instruction with respect to the display image D1 will be described.

When the user inputs a change instruction with respect to the display image D1 by using the input unit 107, the CPU 101 performs the following control based on the functional structure described above. Specifically, first, the first operation interpretation object 201 generates a request to change an angle of view based on the change instruction input by the user and supplies the request to the angle-of-view synchronization module 203.

The angle-of-view synchronization module 203 supplies the request to change an angle of view to the first image display module 205 and the second image display module 206. The first image display module 205 changes an angle of view with respect to the display area A1 of the image pyramid structure 50A based on the request to change an angle of view that has been supplied from the angle-of-view synchronization module 203. The second image display module 206 changes an angle of view with respect to the display area A2 of the image pyramid structure 50B based on the request to change an angle of view that has been supplied from angle-of-view synchronization module 203. The first image display module 205 and the second image display module 206 are supplied with the same request to change an angle of view, with the result that the display range of the display image D1 and that of the display image D2 are subjected to the same change.

As described above, when the user inputs the change instruction with respect to the display image D1, the display range of the display image D1 and the display range of the display image D2 are changed in conjunction with each other. Next, the case where the user inputs a change instruction with respect to the display image D2 will be described.

When the user inputs a change instruction with respect to the display image D2 by using the input unit 107, the CPU 101 performs the following control based on the functional structure described above. Specifically, first, the second operation interpretation object 202 generates a request for position correction based on the change instruction input by the user and supplies the request to the position correction module 204.

The position correction module 204 supplies the request for position correction to the second image display module 206. The second image display module 206 changes an angle of view with respect to the display area A2 of the image pyramid structure 50B based on the request for position correction that has been supplied from the position correction module 204. As a result, the display range of the display image D2 is changed. It should be noted that since the request for position correction is not supplied to the first image display module 205, the display range of the display image D1 is not changed.

Figure 9A:
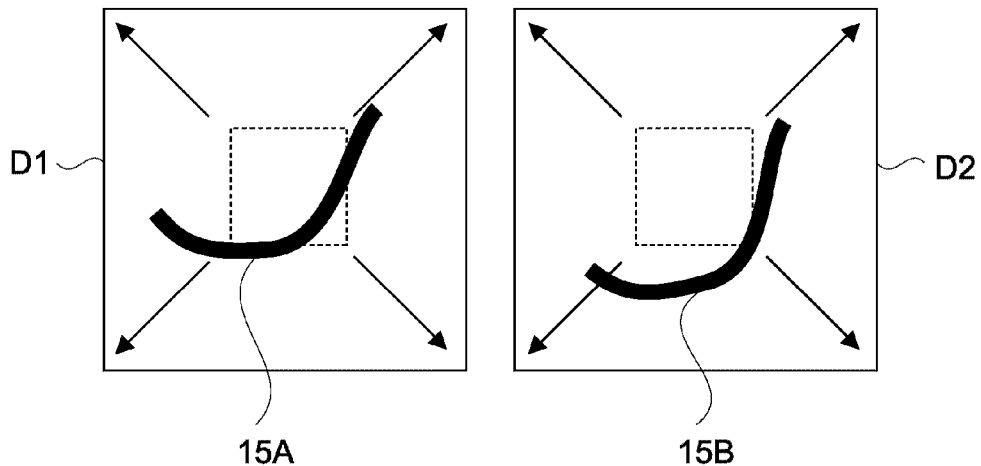
FIGS. 9A, 9B and 9C are schematic diagrams each showing changed states of example display ranges of two display images in the second example embodiment.
Figure 9B:
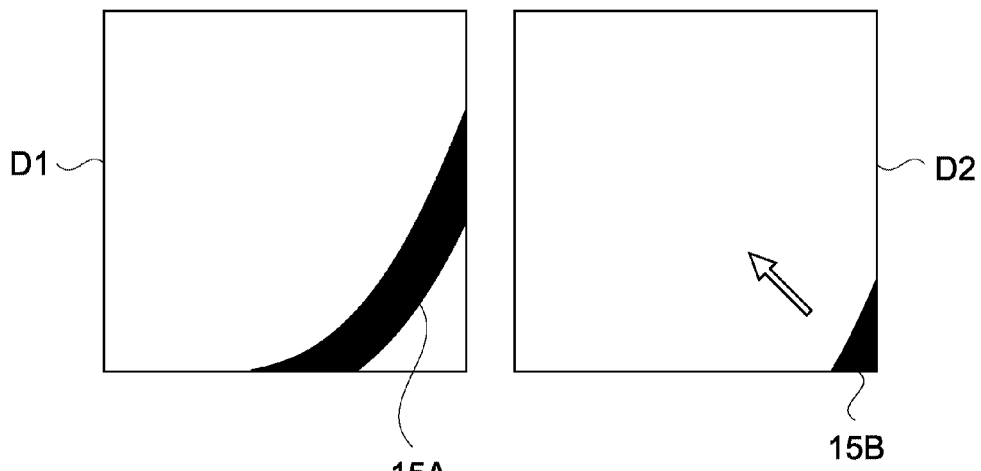

FIG. 9 are schematic diagrams each showing changed states of the display ranges of the display image D1 and the display image D2. In the display image D1 and the display image D2 shown in FIG. 9A, when an instruction to zoom in an area of the display image D1 that is indicated by a broken line is input, the display ranges of the display image D1 and the display image D2 are zoomed in as indicated by arrows, and the display image D1 and the display image D2 as shown in FIG. 9B are displayed.

Figure 9C:
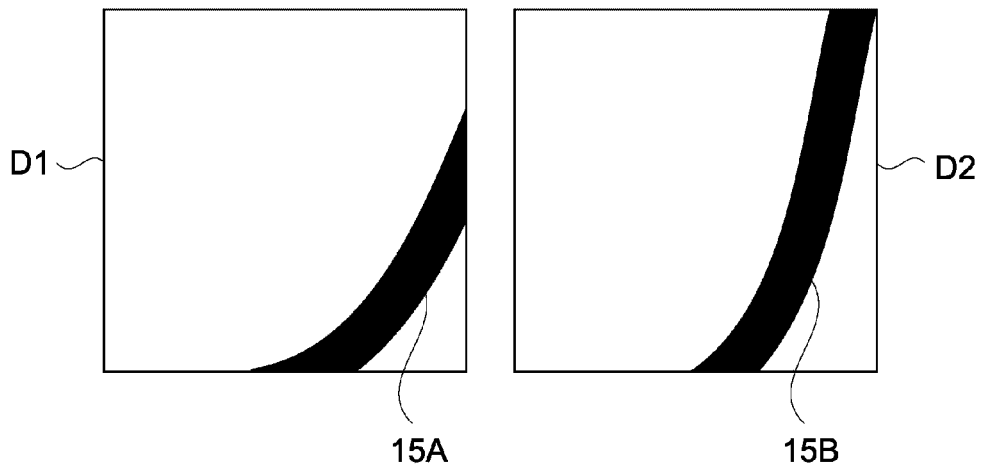

As shown in FIG. 9B, the display range of the display image D1 and that of the display image D2 are subjected to the same change, and as a result of that, there may be a case where a deviation between the first observation target 15A and the second observation target 15B is emphasized and the comparison therebetween is difficult to be made. Then, when an instruction of movement in a direction indicated by the arrow in FIG. 9B is input with respect to the display image D2, only the display range of the display image D2 is changed and substantially the same portions of the first observation target 15A and the second observation target 15B are displayed in parallel with each other as shown in FIG. 9C, thus enabling the comparison with ease.

As described above, according to this example embodiment, the user can simultaneously change the display ranges of the display image D1 and the display image D2 in accordance with a change instruction with respect to the display image D1, and change only the display range of the display image D2 in accordance with a change instruction with respect to the display image D2. As a result, even when a deviation between the first observation target 15A and the second observation target 15B is emphasized when the display ranges of the display image D1 and the display image D2 are simultaneously changed, a position of each of the displayed observation targets can be corrected, with the result that the display image D1 and the display image D2 can be easily compared with each other.

It should be noted that though the display range of the display image D1 and that of the display image D2 are simultaneously changed in accordance with a change instruction with respect to the display image D1 and only the display range of the display image D2 is changed in accordance with a change instruction with respect to the display image D2 in this example embodiment, the reverse may be possible. Specifically, it may be possible to simultaneously change the display range of the display image D1 and that of the display image D2 in accordance with a change instruction with respect to the display image D2 and change only the display range of the display image D1 in accordance with a change instruction with respect to the display image D1.

[Third Example Embodiment]

A third example embodiment of the present disclosure will be described. In the third example embodiment, descriptions of portions that are similar to those in the first and second example embodiments will be omitted. The display image D1 and the display image D2 that are obtained as in the first and second example embodiments are also compared with each other in the third example embodiment, but a mode of displaying display images and a mode of changing display ranges in the third example embodiment are different from those in the first and second example embodiments.

[Display of Two Images in Third Example Embodiment]

When the user inputs an instruction of display of two images and a desired resolution, the CPU 101 sets a display area A1 with respect to the image data E1 of the image pyramid structure 50A and also sets a display area A2 with respect to the image data E2 of the image pyramid structure 50B as in the first example embodiment.

Figure 10:
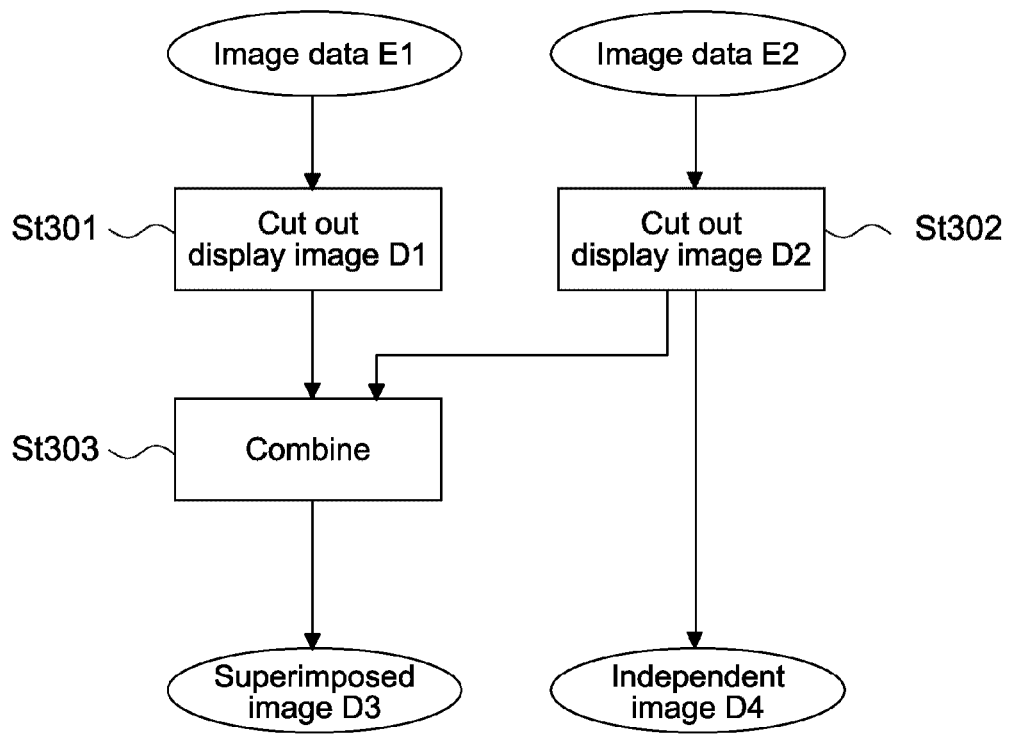
FIG. 10 is a data flow showing an example generation process of a superimposed image and an independent image in a third example embodiment.

FIG. 10 is a data flow showing a generation process of two images displayed on the display unit 106 of this example embodiment.

As shown in FIG. 10, the CPU 101 cuts out, as a display image D1, a portion of the image data E1 that corresponds to the display area A1 (St 301), and then cuts out, as a display image D2, a portion of the image data E2 that corresponds to the display area A2 (St 302). The CPU 101 combines the display image D1 and the display image D2 separately cut out in a superimposed manner, and generates a superimposed image D3 (St 303). The display image D2 is not superimposed on the display image D1, and independently constitutes an independent image D4. The combining of two images by superimposition will be described later.

Figure 11:
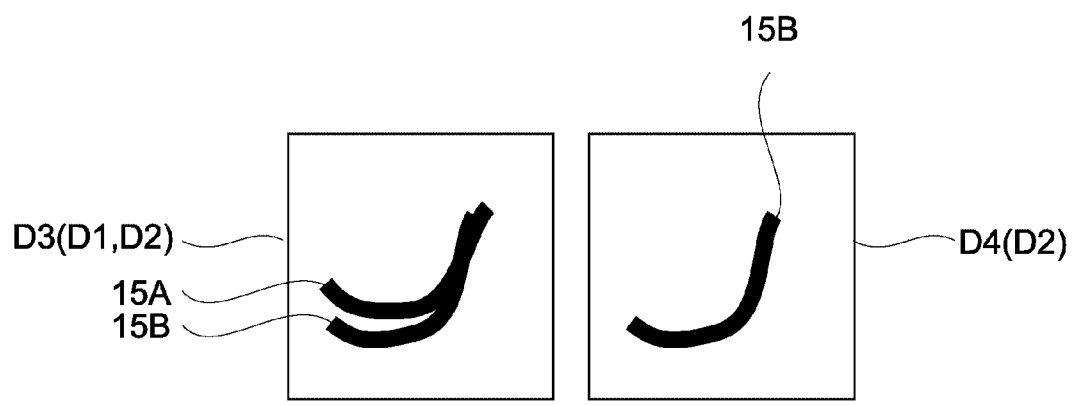
FIG. 11 is a schematic diagram showing the superimposed image and the independent image in the third example embodiment.

The CPU 101 develops the superimposed image D3 and the independent image D4 on the display buffer that is set in the RAM 103. As a result, the superimposed image D3 and the independent image D4 are displayed on the display screen of the display unit 106. FIG. 11 is a schematic diagram showing the superimposed image D3 and the independent image D4 displayed on the display screen. The superimposed image D3 and the independent image D4 are displayed in parallel with each other, e.g., laterally on the display screen of the display unit 106.

As described above, the superimposed image D3 and the independent image D4 are displayed on the display unit 106. As a result, the user can compare the first observation target 15A and the second observation target 15B displayed in a superimposed manner in the superimposed image D3 while referring to the second observation target 15B displayed in the independent image D4.

[Change Instruction of a Display Range Made by User in the Third Example Embodiment]

Here, the change in display range will be described. In the case where the user wishes to change display ranges of the display image D1 and display image D2 displayed as the superimposed image D3 and a display range of the display image D2 displayed as the independent image D4, the user inputs a change instruction to the information processing apparatus via a mouse. For example, when the mouse is dragged in a state where a mouse cursor is put on the superimposed image D3, the CPU 101 receives an input of a change instruction with respect to the superimposed image D3. Similarly, when the mouse is dragged in a state where the mouse cursor is put on the independent image D4, the CPU 101 receives an input of a change instruction with respect to the independent image D4.

The information processing apparatus of this example embodiment changes the respective display ranges of the display image D1 and the display image D2 constituting the superimposed image D3 and of the display image D2 as the independent image D4 in accordance with a change instruction with respect to the superimposed image D3, and changes the display range of the display image D2 constituting the independent image D4 in accordance with a change instruction with respect to the independent image D4. As a result, the user does not need to separately change the display range of the display image D1 constituting the superimposed image D3, that of the display image D2 constituting the superimposed image D3, and that of the display image D2 constituting the independent image D4. In addition, the user can superimpose the first observation target 15A and the second observation target 15B accurately in the superimposed image D3.

[Functional Structure of an Example Information Processing Apparatus According to the Third Example Embodiment]

Figure 12:
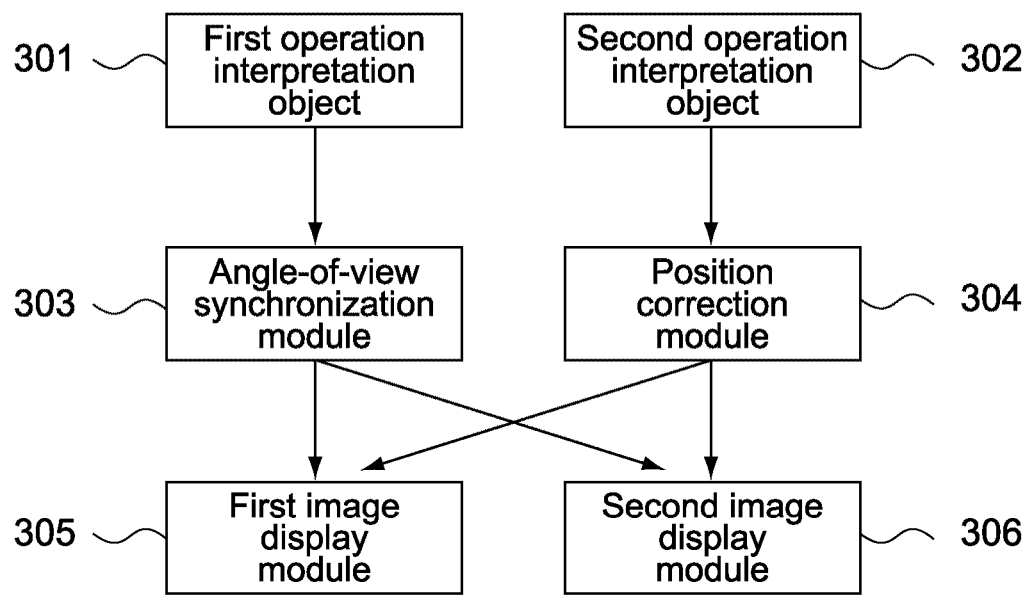
FIG. 12 is a block diagram showing an example functional structure (program structure) of a processing unit according to the third example embodiment.

FIG. 12 is a block diagram showing an example functional structure of a processing unit (image processing unit) that performs change processing on the display image D1 and the display image D2 in the example information processing apparatus of this example embodiment.

As shown in FIG. 12, the processing unit (image processing unit) includes, as functional constituents, a first operation interpretation object 301, a second operation interpretation object 302, an angle-of-view synchronization module 303, a position correction module 304, a first image display module 305, and a second image display module 306 that are stored in the ROM 102, the storage unit 108, or the like and operate when read by the CPU 101. The angle-of-view synchronization module 303 and the second image display module 306 have the same structure as in the second example embodiment.

The first operation interpretation object 301 generates a request to change an angle of view based on a change instruction with respect to the superimposed image D3, which has been input by the user via the input unit 107, and supplies the request to the angle-of-view synchronization module 303.

The second operation interpretation object 302 generates a request for position correction with respect to the independent image D4 based on a change instruction input by the user via the input unit 107, and supplies the request to the position correction module 304.

The position correction module 304 synchronously supplies the request for position correction, which has been supplied from the second operation interpretation object 302, to the first image display module 305 and the second image display module 306.

The first image display module 305 changes an angle of view with respect to the display area A1 of the image pyramid structure 50A and the display area A2 of the image pyramid structure 50B based on the request to change an angle of view that has been supplied from the angle-of-view synchronization module 303. Further, the first image display module 305 changes an angle of view with respect to the display area A2 of the image pyramid structure 50B based on the request for position correction that has been supplied from the position correction module 304.

[Operation of Changing an Angle of View in Third Example Embodiment]

The case where the user inputs a change instruction with respect to the superimposed image D3 will be described.

When the user inputs a change instruction with respect to the superimposed image D3 by using the input unit 107, the CPU 101 performs the following control based on the functional structure described above. Specifically, first, the first operation interpretation object 301 generates a request to change an angle of view based on the change instruction input by the user and supplies the request to the angle-of-view synchronization module 303.

The angle-of-view synchronization module 303 supplies the request to change an angle of view to the first image display module 305 and the second image display module 306. The first image display module 305 changes an angle of view with respect to the display area A1 of the image pyramid structure 50A based on the request to change an angle of view that has been supplied from the angle-of-view synchronization module 303. The second image display module 306 changes an angle of view with respect to the display area A2 of the image pyramid structure 50B based on the request to change an angle of view that has been supplied from the angle-of-view synchronization module 303. The first image display module 305 and the second image display module 306 are supplied with the same request to change an angle of view, with the result that the display ranges of the display image D1 and display image D2 constituting the superimposed image D3 and the display range of the display image D2 constituting the independent image D4 are subjected to the same change.

As described above, when the user inputs the change instruction with respect to the superimposed image D3, the display ranges of the display image D1 and display image D2 constituting the superimposed image D3 and the display range of the display image D2 constituting the independent image D4 are changed in conjunction with each other. Next, the case where the user inputs a change instruction with respect to the independent image D4 will be described.

When the user inputs a change instruction with respect to the independent image D4 by using the input unit 107, the CPU 101 performs the following control based on the functional structure described above. Specifically, first, the second operation interpretation object 302 generates a request for position correction based on the change instruction input by the user and supplies the request to the position correction module 304.

The position correction module 304 supplies the request for position correction to the first image display module 305 and the second image display module 306. The first image display module 305 changes an angle of view with respect to the display area A2 of the image pyramid structure 50B based on the request for position correction that has been supplied from the position correction module 304. The second image display module 306 changes an angle of view with respect to the display area A2 of the image pyramid structure 50B based on the request for position correction that has been supplied from the position correction module 304. Since the first image display module 305 and the second image display module 306 are supplied with the same request for position correction, the display range of the display image D2 constituting the superimposed image D3 and that of the display image D2 constituting the independent image D4 are subjected to the same change. Since the first image display module 305 does not change an angle of view with respect to the display area A1 of the image pyramid structure 50A even when receiving the request for position correction, the display range of the display image D1 constituting the superimposed image D3 is not changed.

Figure 13A:
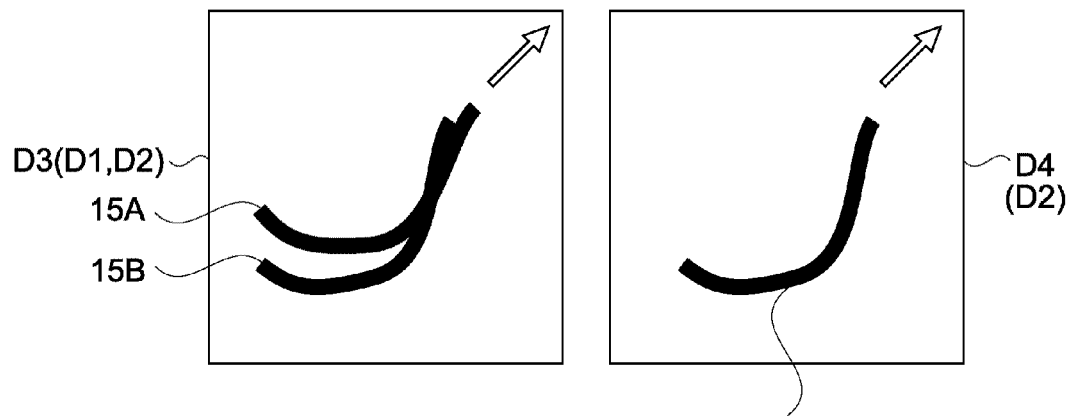
FIGS. 13A, 13B and 13C are schematic diagrams each showing changed states of example display ranges of display images constituting the superimposed image and the independent image in the third example embodiment.
Figure 13B:
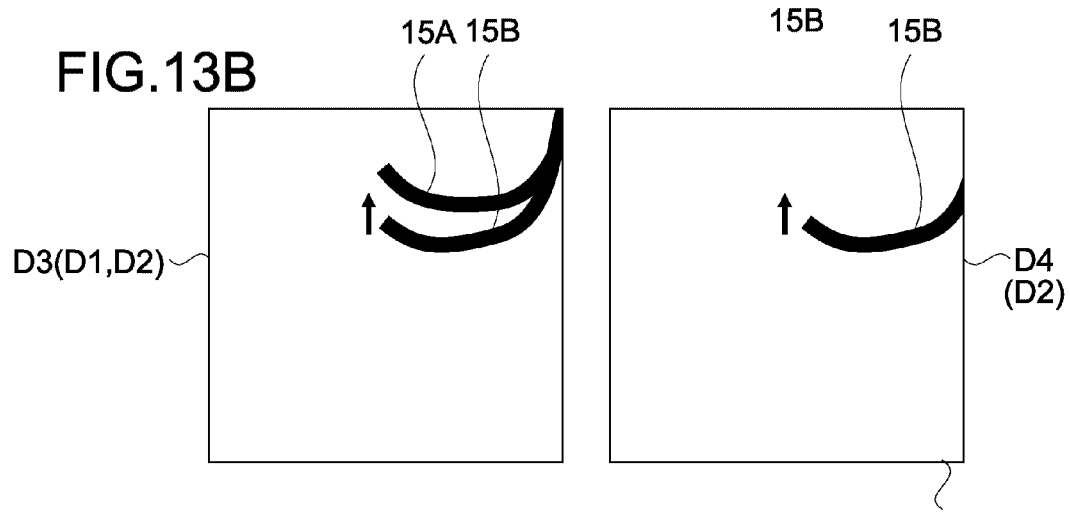

FIG. 13 are schematic diagrams each showing changed states of the display ranges of the display image D1 and display image D2 constituting the superimposed image D3 and the display range of the display image D2 constituting the independent image D4. In the superimposed image D3 and the independent image D4 shown in FIG. 13A, when an instruction of movement in a direction indicated by arrows is input with respect to the superimposed image D3, the display ranges of the display image D1 and display image D2 constituting the superimposed image D3 and the display range of the display image D2 constituting the independent image D4 are changed, with the result that the superimposed image D3 and the independent image D4 shown in FIG. 13B are displayed.

Figure 13C:
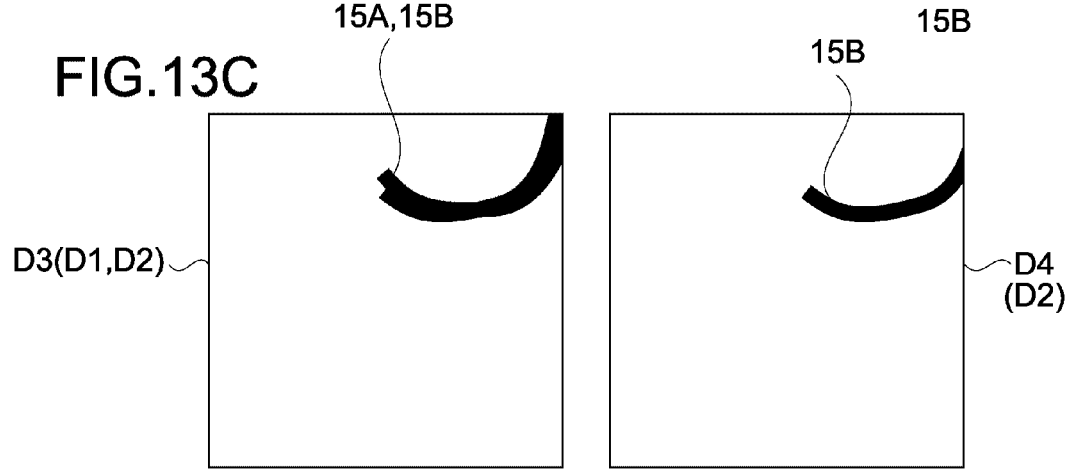

Then, when an instruction of movement in a direction indicated by arrows is input with respect to the independent image D4 as shown in FIG. 13B, the display range of the display image D2 constituting the superimposed image D3 and that of the display image D2 constituting the independent image D4 are changed, and the superimposed image D3 and the independent image D4 shown in FIG. 13C are displayed. As a result, in the superimposed image D3, positions of the first observation target 15A and the second observation target 15B can be adjusted so that substantially the same portions of the first observation target 15A and the second observation target 15B are displayed in a superimposed manner as shown in FIG. 13C.

As described above, according to this example embodiment, the user can simultaneously change the display ranges of the display image D1 and the display image D2 constituting the superimposed image D3 and the display range of the display image D2 constituting the independent image D4 in accordance with a change instruction with respect to the superimposed image D3, and change only the display range of the display image D2 constituting each of the superimposed image D3 and the independent image D4 in accordance with a change instruction with respect to the independent image D4. As a result, the user can compare the first observation target 15A and the second observation target 15B that are displayed in a superimposed manner in the superimposed image D3 while referring to the second observation target 15B displayed in the independent image D4. In addition, the user can adjust the positions of the first observation target 15A and the second observation target 15B that are superimposed on each other, with the result that the display image D1 and the display image D2 can easily be compared with each other.

[Fourth Example Embodiment]

A fourth example embodiment of the present disclosure will be described. In the fourth example embodiment, descriptions of portions that are similar to those in the third example embodiment will be omitted. The display image D1 and the display image D2 that are obtained as in the third example embodiment are also compared with each other in the fourth example embodiment, but a mode of displaying display images in the fourth example embodiment is different from that in the third example embodiment.

[Display of Two Images in the Fourth Example Embodiment]

When the user inputs an instruction of display of two images and a desired resolution, the CPU 101 sets a display area A1 with respect to the image data E1 of the image pyramid structure 50A and also sets a display area A2 with respect to the image data E2 of the image pyramid structure 50B as in the third example embodiment.

Figure 14:
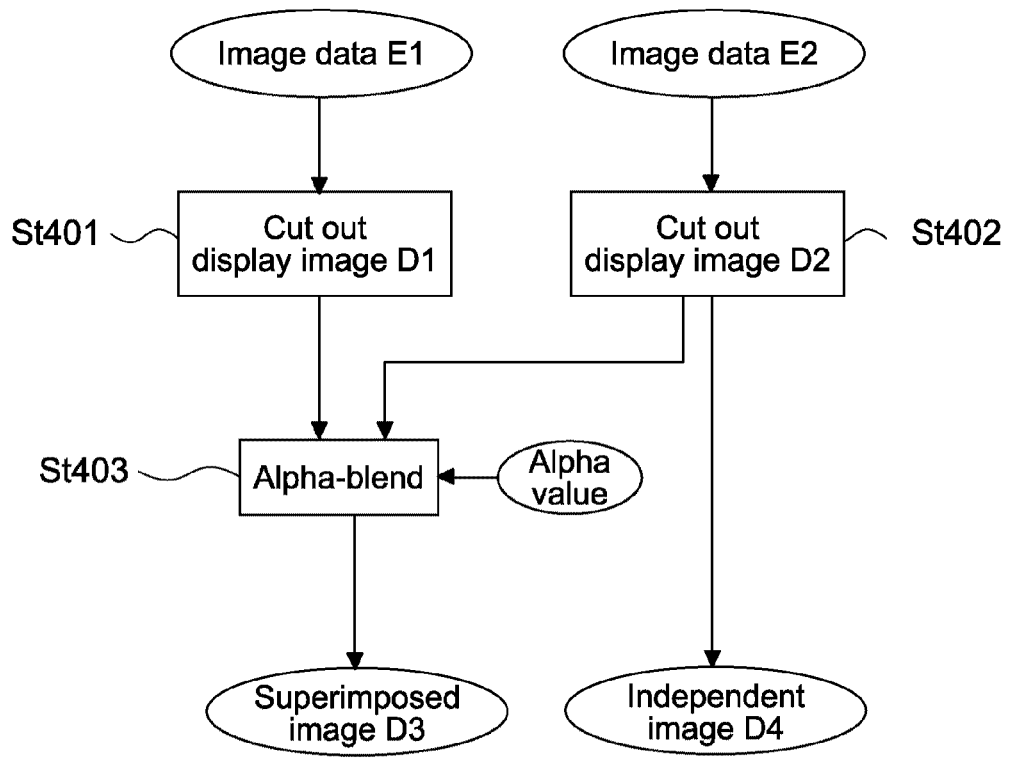
FIG. 14 is a data flow showing an example generation process of a superimposed image and an independent image in a fourth example embodiment.

FIG. 14 is a data flow showing a generation process of two images displayed on the display unit 106 of this example embodiment.

As shown in FIG. 14, the CPU 101 cuts out, as a display image D1, a portion of the image data E1 that corresponds to the display area A1 (St 401), and then cuts out, as a display image D2, a portion of the image data E2 that corresponds to the display area A2 (St 402). Then, the CPU 101 alpha-blends the display image D1 and the display image D2 based on an alpha value (transmittance) that has been input by the user or set in advance (St 403). By the alpha-blending, a superimposed image D3 obtained by superimposing the display image D1 and the display image D2 is generated. Further, the CPU 101 assumes the display image D2 as an independent image D4. It should be noted that in this example embodiment, the alpha value is equivalent to display control information.

Figure 15:
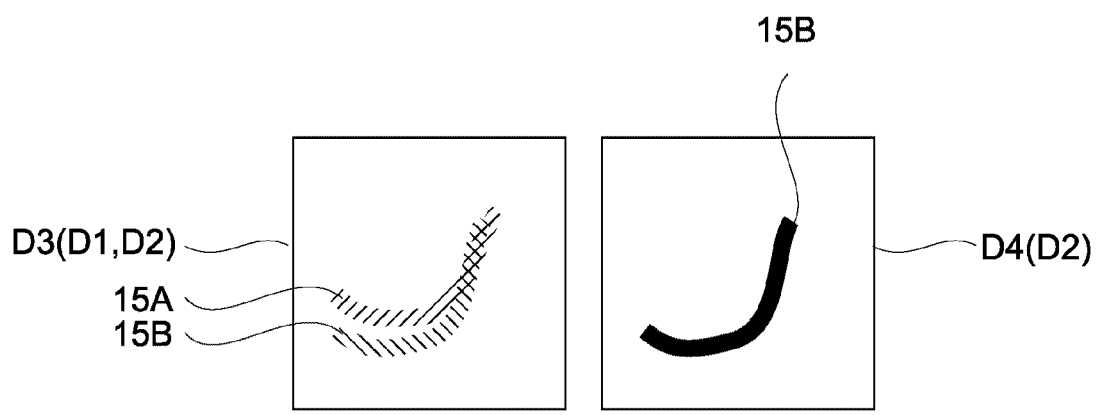
FIG. 15 is a schematic diagram showing the superimposed image and the independent image in the fourth example embodiment.

The CPU 101 develops the superimposed image D3 and the independent image D4 on the display buffer that is set in the RAM 103. As a result, the display image D1 and the display image D2 are displayed on the display screen of the display unit 106. FIG. 15 is a schematic diagram showing the superimposed image D3 and the independent image D4. It should be noted that in FIG. 15, translucent states of the display image D1 and display image D2 are expressed by hatching. The superimposed image D3 and the independent image D4 are displayed in parallel with each other, e.g., laterally on the display screen of the display unit 106. As described above, since the display image D1 and the display image D2 are alpha-blended, the first observation target 15A and the second observation target 15B are superimposed at a predetermined transmittance and displayed in the superimposed image D3. On the other hand, the display image D2 is displayed as it is in the independent image D4.

As described above, the superimposed image D3 and the independent image D4 are displayed on the display unit 106. Since the display image D1 and the display image D2 are alpha-blended in the superimposed image D3, the display image D1 and the display image D2 can be set as translucent images, with the result that a portion of the first observation target 15A and a portion of the second observation target 15B can be visually identified even if the portions are superimposed on each other. Further, by arbitrarily changing the alpha value, it becomes easy to judge to which portion of the display image D1 and the display image D2 a part focused on belongs.

In the state where the superimposed image D3 and the independent image D4 are displayed as described above, a change instruction with respect to the superimposed image D3 or independent image D4 is input as in the third example embodiment, and thus the display ranges of the display image D1 and the display image D2 are changed. The user can compare the first observation target 15A and the second observation target 15B that are displayed in a superimposed manner in the superimposed image D3 while referring to the second observation target 15B displayed in the independent image D4. In addition, the user can adjust the positions of the first observation target 15A and the second observation target 15B that are superimposed on each other, with the result that the display image D1 and the display image D2 can easily be compared with each other. It should be noted that the alpha value may be changed while a change instruction is made with respect to the superimposed image D3 or the independent image D4.

The parameter applied to the display image D1 and the display image D2 (alpha value), which is input by the user, may be stored separately from the image pyramid structure 50A and the image pyramid structure 50B and given and received via a removable recording medium or a network connected to the information processing apparatus. The CPU 101 can change the transmittance of the display image D1 and the display image D2 based on the given and received parameter. With this structure, another user does not need an input operation of parameters separately. It should be noted that each of the network and the removable recording medium is equivalent to a second giving and receiving unit.

[Fifth Example Embodiment]

A fifth example embodiment of the present disclosure will be described. In the fifth example embodiment, descriptions of portions that are similar to those in the third example embodiment will be omitted. The display image D1 and the display image D2 that are obtained as in the third example embodiment are also compared with each other in the fifth example embodiment, but a mode of displaying display images in the fifth example embodiment is different from that in the third example embodiment.

[Display of Two Images in the Fifth Example Embodiment]

When the user inputs an instruction of display of two images and a desired resolution, the CPU 101 sets a display area A1 with respect to the image data E1 of the image pyramid structure 50A and also sets a display area A2 with respect to the image data E2 of the image pyramid structure 50B as in the third example embodiment.

Figure 16:
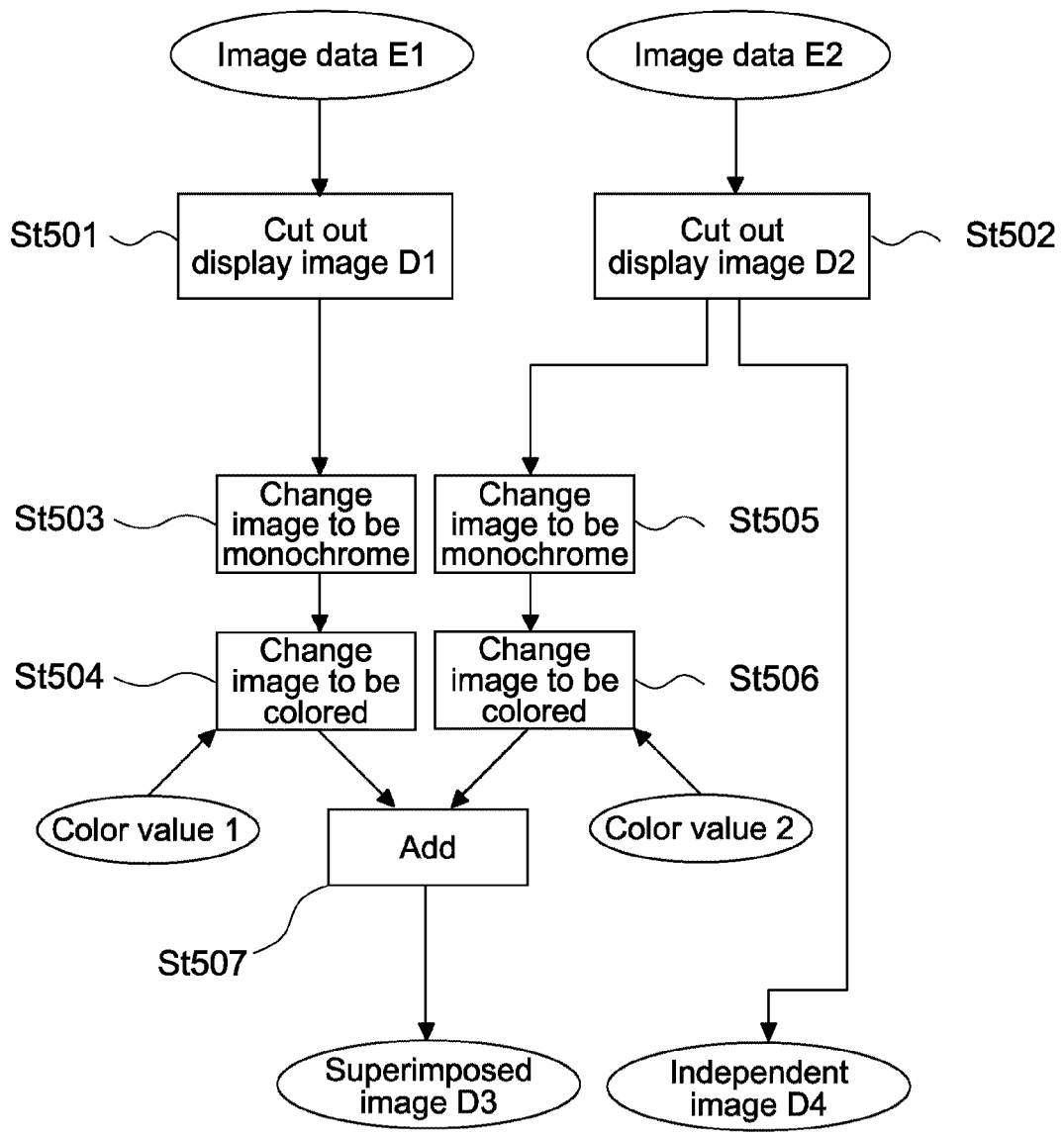
FIG. 16 is a data flow showing an example generation process of a superimposed image and an independent image in a fifth example embodiment.

FIG. 16 is a data flow showing a generation process of two images displayed on the display unit 106 of this example embodiment.

As shown in FIG. 16, the CPU 101 cuts out, as a display image D1, a portion of the image data E1 that corresponds to the display area A1 (St 501), and then cuts out, as a display image D2, a portion of the image data E2 that corresponds to the display area A2 (St 502). Subsequently, the CPU 101 changes the display image D1 into a monochrome image (St 503), and changes the monochrome display image D1 into a colored image by applying a color value 1 defining a first monochrome hue (tone) to the monochrome display image D1 (St 504). As a result, the display image D1 of the first hue is generated. Further, the CPU 101 changes the display image D2 into a monochrome image (St 505), and changes the monochrome display image D2 into a colored image by applying a color value 2 defining a second hue different from the first hue to the monochrome display image D2 (St 506). As a result, the display image D2 of the second hue is generated. Then, the CPU 101 adds the colored display image D1 and display image D2 by an adder (St 507) and generates a superimposed image D3. In addition, the CPU 101 sets the display image D2 as an independent image D4. It should be noted that the color values are equivalent to the display control information in this example embodiment.

Figure 17:
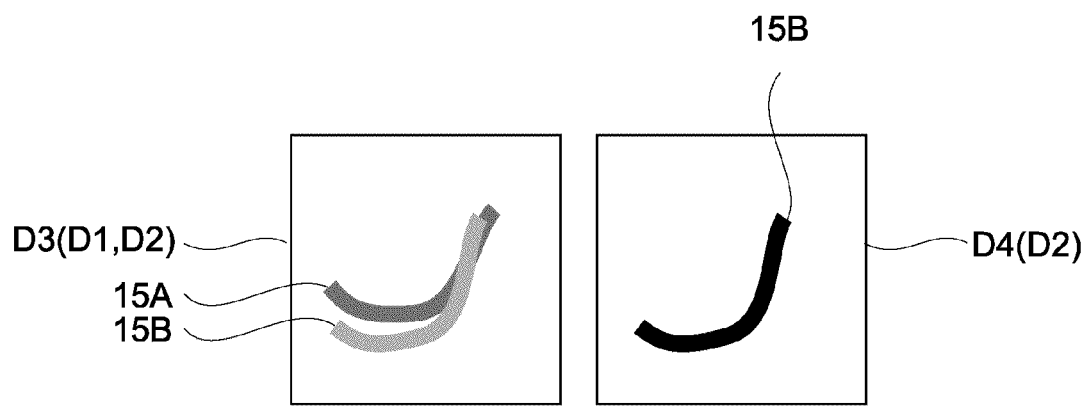
FIG. 17 is a schematic diagram showing the superimposed image and the independent image in the fifth embodiment.

The CPU 101 develops the superimposed image D3 and the independent image D4 on the display buffer that is set in the RAM 103. As a result, the superimposed image D3 and the independent image D4 are displayed on the display screen of the display unit 106. FIG. 17 is a schematic diagram showing the superimposed image D3 and the independent image D4. It should be noted that in FIG. 17, the hues of the display image D1 and display image D2 are expressed by a difference in intensity (shading). The superimposed image D3 and the independent image D4 are displayed in parallel with each other, e.g., laterally on the display screen of the display unit 106. As described above, since the display image D1 and the display image D2 have the monochrome hues different from each other, the first observation target 15A and the second observation target 15B each have a different hue in the superimposed image D3. On the other hand, the second observation target 15B is displayed in the original hue in the independent image D4.

As described above, the superimposed image D3 and the independent image D4 are displayed on the display unit 106. Since the display image D1 and the display image D2 have the monochrome hues different from each other in the superimposed image D3, the user can easily judge to which of the display image D1 and the display image D2 in the superimposed image D3 a part focused on belongs.

In the state where the superimposed image D3 and the independent image D4 are displayed as described above, a change instruction with respect to the superimposed image D3 or independent image D4 is input as in the third example embodiment, and thus the display ranges of the display image D1 and the display image D2 are changed. The user can compare the first observation target 15A and the second observation target 15B that are displayed in a superimposed manner in the superimposed image D3 while referring to the second observation target 15B displayed in the independent image D4. In addition, the user can adjust the positions of the first observation target 15A and the second observation target 15B that are superimposed on each other, with the result that the display image D1 and the display image D2 can easily be compared with each other.

The parameter applied to the display image D1 and the display image D2 (color value), which is input by the user, may be stored separately from the image pyramid structure 50A and the image pyramid structure 50B and given and received via a removable recording medium or a network connected to the information processing apparatus. The CPU 101 can change the hues of the display image D1 and the display image D2 based on the given and received parameter. With this structure, another user does not need an input operation of parameters separately. It should be noted that each of the network and the removable recording medium is equivalent to the second giving and receiving unit.

[Sixth Example Embodiment]

A sixth example embodiment of the present disclosure will be described. In the sixth example embodiment, descriptions of portions that are similar to those in the third example embodiment will be omitted. The display image D1 and the display image D2 that are obtained as in the third example embodiment are also compared with each other in the sixth example embodiment, but a mode of displaying display images in the sixth example embodiment is different from that in the third embodiment.

[Display of Two Images in Sixth Example Embodiment]

When the user inputs an instruction of display of two images and a desired resolution, the CPU 101 sets a display area A1 with respect to the image data E1 of the image pyramid structure 50A and also sets a display area A2 with respect to the image data E2 of the image pyramid structure 50B as in the first example embodiment.

The CPU 101 displays the display image D1 and the display image D2 on the display unit 106. Then, the CPU 101 performs affine transformation on one of or both of the display image D1 and the display image D2 in accordance with the input made by the user via the input unit 107. Hereinafter, the affine transformation will be described.

FIG. 18 are schematic diagrams each showing a state of the affine transformation on the display image D1 and the display image D2.

In the affine transformation, a plurality of control points arranged in the display image D1 and the display image D2 are used. FIG. 18A shows the display image D1 and the display image D2 in which control points are set. As shown in FIG. 18A, the user sets control points P1 in the display image D1 and sets control points P2 in the display image D2. The control points P1 are arbitrarily set to a plurality of points including characteristic points of the display image D1. Similarly, the control points P2 are arbitrarily set to a plurality of points including characteristic points of the display image D2. The control points P1 and the control points P2 are set to points corresponding to each other. In FIG. 18A, nine control points P1 and nine control points P2 are set. Further in FIG. 18A, end points, a middle points, corner portions, and the like of the first observation target 15A and the first observation target 15B are set as characteristic points in the display image D1 and the display image D2. It should be noted that coordinates of the control points P1 and control points P2 are equal to the display control information.

The user provides an input to notify that the control points are completely set via the input unit 107. The CPU 101 generates a TIN (Triangulated Irregular Network) based on the plurality of control points P1 in the display image D1, and also generates a TIN based on the plurality of control points P2 in the display image D2. FIG. 18B shows the generated TINS by broken lines. The TIN is a triangle with the plurality of control points as vertices. A triangle whose shape is close to a regular triangle is suitable for the triangle described above. Although there are various principles of the TIN generating method, for example, the principle of maximizing a minimum angle in which a minimum angle of a triangle group to be generated is set to be larger than that obtained by a different dividing method can be used.

Next, the CPU 101 performs affine transformation on the display image D1 for each generated triangle so that a shape of the triangle coincides with that of a corresponding triangle of the display image D2. FIG. 18C shows the display image D1 that has been subjected to the affine transformation. The affine transformation is any one of movement, rotation, lateral inversion, enlargement, contraction, shearing, and the like, or a combination of some of them, and can be performed using a texture mapping technique. By performing affine transformation on each triangle of the TIN, a portion of the first observation target 15A and a portion of the second observation target 15B that corresponds to the portion of the first observation target 15A can be superimposed on each other while suppressing a distortion of the images. It should be noted that though the display image D1 is deformed in this case, the display image D2 may be deformed instead of the display image D1. Further, both the display image D1 and the display image D2 may be deformed. The CPU 101 superimposes the deformed display image D1 and the display image D2 that is not deformed to generate the superimposed image D3. In addition, the CPU 101 sets the display image D2 not deformed as an independent image D4.

The CPU 101 develops the superimposed image D3 and the independent image D4 on the display buffer that is set in the RAM 103. As a result, the superimposed image D3 and the independent image D4 are displayed on the display screen of the display unit 106. Since the display image D1 is deformed in the superimposed image D3 so that the first observation target 15A is closely analogous to the second observation target 15B, the corresponding portions between the first observation target 15A and the second observation target 15B are displayed in a superimposed manner, and accordingly the user can easily compare the corresponding portions between the first observation target 15A and the second observation target 15B with each other.

In the state where the superimposed image D3 and the independent image D4 are displayed as described above, a change instruction with respect to the superimposed image D3 or independent image D4 is input as in the third example embodiment, and thus the display ranges of the display image D1 and the display image D2 are changed. The user can compare the first observation target 15A and the second observation target 15B that are displayed in a superimposed manner in the superimposed image D3 while referring to the second observation target 15B displayed in the independent image D4. In addition, since the user can adjust the positions of the first observation target 15A and the second observation target 15B that are superimposed on each other, the display image D1 and the display image D2 can easily be compared with each other.

The parameter for deforming the display image D1 or the display image D2 (coordinates of control point, or the like), which is input by the user, may be stored separately from the image pyramid structure 50A and the image pyramid structure 50B and given and received via a removable recording medium or a network connected to the information processing apparatus. The CPU 101 can deform the display image D1 and the display image D2 based on the given and received parameter. With this structure, another user does not need an input operation of parameters separately. It should be noted that each of the network and the removable recording medium is equivalent to the second giving and receiving unit.

[Seventh Example Embodiment]

A seventh example embodiment of the present disclosure will be described. In the seventh example embodiment, descriptions of portions that are similar to those in the first and third example embodiments will be omitted. The display image D1 and the display image D2 that are obtained as in the first example embodiment are also compared with each other in the seventh example embodiment, but a mode of displaying display images in the seventh example embodiment is different from that in the first example embodiment.

[Display of Two Images in the Seventh Example Embodiment]

When the user inputs an instruction of display of two images and a desired resolution, the CPU 101 sets a display area A1 with respect to the image data E1 of the image pyramid structure 50A and also sets a display area A2 with respect to the image data E2 of the image pyramid structure 50B as in the first example embodiment.

The CPU 101 develops the display image D1 and the display image D2 on the display buffer that is set in the RAM 103. As a result, the superimposed image D3 and the independent image D4 are displayed on the display screen of the display unit 106. Here, there may be a case where annotations are set for the display image D1 and the display image D2 displayed on the display unit 106. The annotation refers to notes obtained by visually combining positional information and content information. The positional information is set for a point to be focused in an image by a user, e.g., a part with a potential for disease. The content information is associated with the positional information.

Figure 19A:
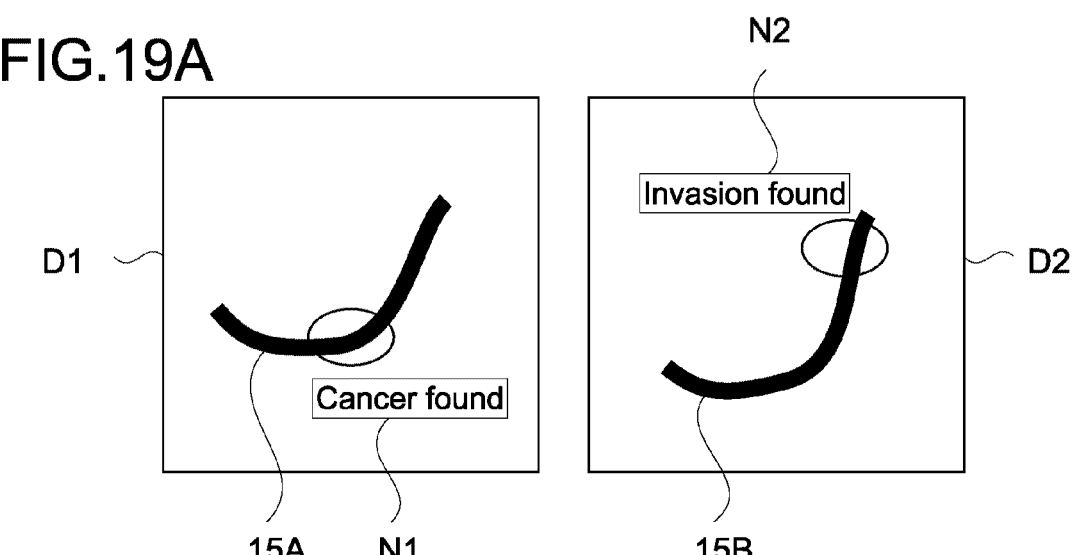
FIGS. 19A, 19B and 19C are schematic diagrams each showing two display images to which annotations are set in a seventh embodiment.
Figure 19B:
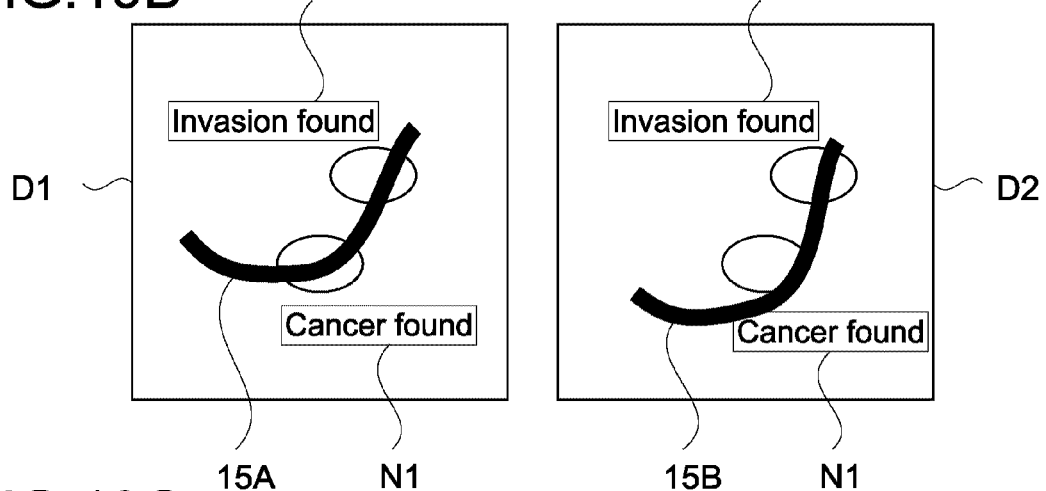

FIG. 19 are schematic diagrams showing the display image D1 and the display image D2 for which annotations are set. As shown in FIG. 19A, the user sets an annotation N1 in the display image D1 and sets an annotation N2 in the display image D2. Here, as shown in FIG. 19B, the CPU 101 also displays the annotation N1 in the display image D2, and displays the annotation N2 in the display image D1. As a result, the user can easily compare a part of the first observation target 15A for which the annotation N1 is set in the display image D1, with a corresponding part of the second observation target 15B for which the annotation is not set in the display image D2. Similarly, the user can easily compare a part of the second observation target 15B for which the annotation N2 is set in the display image D2, with a corresponding part of the first observation target 15A for which the annotation is not set in the display image D1.

As in the first example embodiment or the second example embodiment, a change instruction with respect to the display image D1 for which the annotation N1 and the annotation N2 are set or the display image D2 for which the annotation N1 and the annotation N2 are set is input, and thus the display ranges of the display image D1 and the display image D2 are changed. The user can compare the corresponding parts between the first observation target 15A and the second observation target 15B easily while referring to the annotation N1 and the annotation N2 that are set in the display image D1 and the display image D2.

Figure 19C:
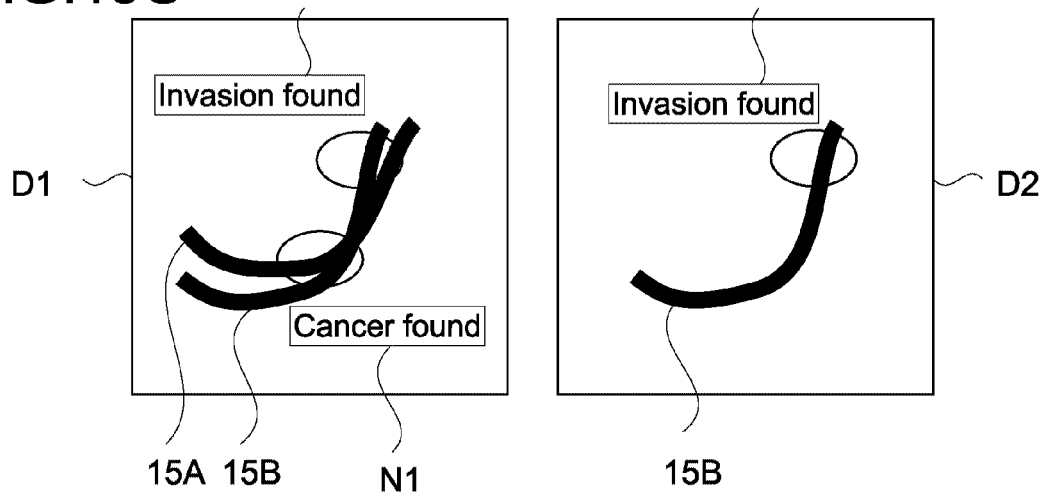

Further, as shown in FIG. 19C, the CPU 101 may superimpose the display image D1 for which the annotation N1 is set and the display image D2 for which the annotation N2 is set on each other to generate the superimposed image D3. In the superimposed image D3, the annotation N1 attached to the display image D1 and the annotation N2 attached to the display image D2 are displayed. In this case, the CPU 101 sets the display image D2 for which the annotation N2 is set, as an independent image D4.

As in the third example embodiment, a change instruction is input with respect to the superimposed image D3 for which the annotation N1 and the annotation N2 are set or the independent image D4 for which the annotation N2 is set, and thus the display ranges of the display image D1 and the display image D2 are changed. The user can compare the corresponding parts between the first observation target 15A and the second observation target 15B easily while referring to the annotation N1 and the annotation N2 that are set in the superimposed image D3.

The present disclosure is not limited to the example embodiments described above, and can be modified without departing from the gist of the present disclosure.

In the above description, the image data that forms the image pyramid structure 50 is stored in the storage unit 108 of the information processing apparatus. However, it may be possible for a computer or sever different from the information processing apparatus to store image data forming the image pyramid structure 50 and for an information processing apparatus used as a terminal apparatus by a user to access the different computer or server to receive that image data. In this case, the information processing apparatus as a terminal apparatus and the server or the like may be connected via a network of a LAN, a WAN, or the like. Particularly, the use of a WAN allows telepathology, remote diagnostics, and the like to be realized. In the example embodiments described above, the image pyramid structure is used as a method of changing the display ranges efficiently. However, only the original image data may be used for changing display ranges without using the image pyramid structure. In addition, only one sheet of image data may be used instead of tiles, for example.

In the example embodiments described above, the image processing unit is assumed as a CPU, but it is not limited thereto. The image processing unit may be, for example, a three-dimensional graphics processing module.

It should be understood that various changes and modifications to the presently preferred example embodiments described herein will be apparent to those skilled in the art. Such changes and modifications can be made without departing from the spirit and scope and without diminishing its intended advantages. It is therefore intended that such changes and modifications be covered by the appended claims.

The application is claimed as following:

1. An information processing apparatus comprising:
   a processor;
   a display device operatively coupled to the processor;
   an input device operatively coupled to the processor; and
   a memory device operatively coupled to the processor, the memory device storing instructions that cause the processor, in cooperation with the display device, the input device and the memory device, to:
   (a) display a first image associated with a first observation target object, the first image having a first display range;
   (b) display a second image associated with a second observation target object, the second image having a second display range;
   (c) enable a user to change the first display range;
   (d) in response to the first display range being changed, simultaneously change the second display range; and
   (e) form a superimposed image by displaying a third image overlaying the first image, the third image:
      (i) having a third display range;
      (ii) being associated with the second observation target image; and
      (iii) corresponding to the second image.

2. The information processing apparatus of claim 1, wherein the first observation target object is different from the second observation target object.

3. The information processing apparatus of claim 1, wherein:
   (a) the first image corresponds to a first slice of the observation target object; and
   (b) the second image corresponds to a second, different slice of the observation target object.

4. The information processing apparatus of claim 1, wherein:
   (a) the first image has a first resolution; and
   (b) the second image has a second, different resolution.

5. The information processing apparatus of claim 1, wherein the instructions, when executed by the processor, cause the processor to:
   (a) enable the user to change the first display range to a fourth display range; and
   (b) in response to the first display range being changed, simultaneously change the second display range to a fifth display range.

6. The information processing apparatus of claim 1, wherein the instructions, when executed by the processor, cause the processor to:
   (a) enable the user to change the second display range; and
   (b) in response to the second display range being changed, cause the first display range to remain unchanged.

7. The information processing apparatus of claim 1, wherein:
   (a) at least a portion of the first image is changed to a first color; and
   (b) at least a portion of the second image is changed to a second, different color.

8. The information processing apparatus of claim 1, wherein the instructions, when executed by the processor, cause the processor to operate with the input device to enable the user to:
   (a) for the first image, input a first annotation; and
   (b) for the second image, input a second, different annotation.

9. The information processing apparatus of claim 1, wherein the instructions, when executed by the processor, cause the processor to operate with the input device to:
   (a) enable the user to simultaneously change the first display range and the third display range; and
   (b) in response to the first display range and the third display range being changed, simultaneously change the second display range.

10. The information processing apparatus of claim 1, wherein the instructions, when executed by the processor, cause the processor to operate with the input device to:
    (a) enable the user to change the second display range; and
    (b) in response to the second display range being changed:
       (i) simultaneously change the third display range; and
       (ii) cause the first display range to remain unchanged.

11. The information processing apparatus of claim 1, wherein:
    (a) the first image is set as a first translucent image, the first image having a first portion;
    (b) the third image is set as a second translucent image, the third image having a second portion; and
    (c) the instructions, when executed by the processor, cause the processor to simultaneously display the first portion and the second portion such that the first portion and the second portion can each be visually identified.

12. A method of operating an information processing apparatus including instructions, the method comprising:
    (a) causing a display device to display a first image associated with a first observation target object, the first image having a first display range;
    (b) causing the display device to display a second image associated with a second observation target object, the second image having a second display range;
    (c) causing a processor to execute the instructions to operate with an input device to enable a user to change the first display range;
    (d) in response to the first display range being changed, causing the processor to execute the instructions to simultaneously change the second display range; and
    (e) causing the processor to execute the instructions to form a superimposed image by displaying a third image overlaying the first image, the third image:

(i) having a third display range;
(ii) being associated with the second observation target image; and
(iii) corresponding to the second image.

13. The method of claim 12, which includes:
(a) causing the processor to execute the instructions to operate with the input device to enable the user to change the first display range to a forth display range; and
(b) in response to the first display range being changed, causing the processor to execute the instructions to simultaneously change the second display range to a fifth display range.

14. The method of claim 12, which includes:
(a) causing the processor to execute the instructions to operate with the input device to enable the user to change the second display range; and
(b) in response to the second display range being changed, causing the processor to execute the instructions to cause the first display range to remain unchanged.

15. The method of claim 12, which includes:
(a) causing the processor to execute the instructions to change at least a portion of the first image to a first color; and
(b) causing the processor to execute the instructions to change at least a portion of the second image to a second, different color.

16. The method of claim 12, which includes:
(a) causing the processor to execute the instructions to operate with the input device to enable the user to simultaneously change the first display range and the third display range; and
(b) in response to the first display range and the third display range being changed, causing the processor to execute the instructions to operate with the display device to simultaneously change the second display range.

17. The method of claim 12, which includes:
(a) causing the processor to execute the instructions to operate with the input device to enable the user to change the second display range; and
(b) in response to the second display range being changed:
(i) causing the processor to execute the instructions to simultaneously change the third display range; and
(ii) causing the processor to execute the instructions to cause the first display range to remain unchanged.

18. The method of claim 12, which includes:
(a) causing the processor to execute the instructions to set the first image as a first translucent image, the first image having a first portion;
(b) causing the processor to execute the instructions to set the third image as a second translucent image, the third image having a second portion; and
(c) causing the processor to execute the instructions to operate with the display device to simultaneously display the first portion and the second portion such that the first portion and the second portion can each be visually identified.

19. A non-transitory computer-readable medium storing instructions structured to cause an information processing apparatus to:
(a) display a first image associated with a first observation target object, the first image having a first display range;
(b) display a second image associated with a second observation target object, the second image having a second display range;
(c) enable a user to change the first display range; and
(d) in response to the first display range being changed, simultaneously change the second display range
(e) form a superimposed image by displaying a third image overlaying the first image, the third image:
(i) having a third display range;
(ii) being associated with the second observation target image; and
(iii) corresponding to the second image.

20. An information processing apparatus comprising:
a processor;
a display device operatively coupled to the processor;
an input device operatively coupled to the processor; and
a memory device operatively coupled to the processor, the memory device storing instructions that cause the processor, in cooperation with the display device, the input device and the memory device, to:
(a) display a first image associated with a first observation target object, the first image having a first display range;
(b) display a second image associated with a second observation target object, the second image having a second display range;
(c) enable a user to change the first display range;
(d) in response to the first display range being changed, simultaneously change the second display range;
(e) for the displayed first image, enable the user to set first control points;
(f) for the displayed second image, enable the user to set second control points, wherein the second control points correspond to the first control points; and
(g) cause a first shape of the first control points to coincide with a second shape of the second control points by performing affine transformation.

21. The information processing apparatus of claim 20, wherein the first observation target object is different from the second observation target object.

22. The information processing apparatus of claim 20, wherein:
(a) the first image corresponds to a first slice of the observation target object; and
(b) the second image corresponds to a second, different slice of the observation target object.

23. The information processing apparatus of claim 20, wherein:
(a) the first image has a first resolution; and
(b) the second image has a second, different resolution.

24. The information processing apparatus of claim 20, wherein the instructions, when executed by the processor, cause the processor to:
(a) enable the user to change the first display range to a third display range; and
(b) in response to the first display range being changed, simultaneously change the second display range to a fourth display range.

25. The information processing apparatus of claim 20, wherein the instructions, when executed by the processor, cause the processor to:
(a) enable the user to change the second display range; and
(b) in response to the second display range being changed, cause the first display range to remain unchanged.

26. The information processing apparatus of claim 20, wherein:
(a) at least a portion of the first image is changed to a first color; and
(b) at least a portion of the second image is changed to a second, different color.

27. The information processing apparatus of claim 20, wherein the instructions, when executed by the processor, cause the processor to operate with the input device to enable the user to:
(a) for the first image, input a first annotation; and
(b) for the second image, input a second, different annotation.

28. The information processing apparatus of claim 20, wherein the instructions, when executed by the processor, cause the processor to form a superimposed image by displaying a third image overlaying the first image, the third image:
(a) having a fifth display range;
(b) being associated with the second observation target image; and
(c) corresponding to the second image.

29. The information processing apparatus of claim 28, wherein the instructions, when executed by the processor, cause the processor to operate with the input device to:
(a) enable the user to simultaneously change the first display range and the fifth display range; and
(b) in response to the first display range and the fifth display range being changed, simultaneously change the second display range.

30. The information processing apparatus of claim 28, wherein the instructions, when executed by the processor, cause the processor to operate with the input device to:
(a) enable the user to change the second display range; and
(b) in response to the second display range being changed:
(i) simultaneously change the fifth display range; and
(ii) cause the first display range to remain unchanged.

31. The information processing apparatus of claim 28, wherein:
(a) the first image is set as a first translucent image, the first image having a first portion;
(b) the third image is set as a second translucent image, the third image having a second portion; and
(c) the instructions, when executed by the processor, cause the processor to simultaneously display the first portion and the second portion such that the first portion and the second portion can each be visually identified.

32. A method of operating an information processing apparatus including instructions, the method comprising:
(a) causing a display device to display a first image associated with a first observation target object, the first image having a first display range;
(b) causing the display device to display a second image associated with a second observation target object, the second image having a second display range;
(c) causing a processor to execute the instructions to operate with an input device to enable a user to change the first display range;
(d) in response to the first display range being changed, causing the processor to execute the instructions to simultaneously change the second display range;
(e) for the displayed first image, causing the processor to execute the instructions to enable the user to set first control points;
(f) for the displayed second image, causing the processor to execute the instructions to enable the user to set second control points, wherein the second control points correspond to the first control points; and
(g) causing the processor to execute the instructions to cause a first shape of the first control points to coincide with a second shape of the second control points by performing affine transformation.

33. The method of claim 32, which includes:
(a) causing the processor to execute the instructions to operate with the input device to enable the user to change the first display range to a third display range; and
(b) in response to the first display range being changed, causing the processor to execute the instructions to simultaneously change the second display range to a fourth display range.

34. The method of claim 32, which includes:
(a) causing the processor to execute the instructions to operate with the input device to enable the user to change the second display range; and
(b) in response to the second display range being changed, causing the processor to execute the instructions to cause the first display range to remain unchanged.

35. The method of claim 32, which includes:
(a) causing the processor to execute the instructions to change at least a portion of the first image to a first color; and
(b) causing the processor to execute the instructions to change at least a portion of the second image to a second, different color.

36. The method of claim 32, which includes causing the processor to execute the instructions to operate with the display device to form a superimposed image by displaying a third image overlaying the first image, the third image:
(a) having a fifth display range;
(b) being associated with the second observation target image; and
(c) corresponding to the second image.

37. The method of claim 36, which includes:
(a) causing the processor to execute the instructions to operate with the input device to enable the user to simultaneously change the first display range and the fifth display range; and
(b) in response to the first display range and the fifth display range being changed, causing the processor to execute the instructions to operate with the display device to simultaneously change the second display range.

38. The method of claim 36, which includes:
(a) causing the processor to execute the instructions to operate with the input device to operate with the input device to enable the user to change the second display range; and
(b) in response to the second display range being changed:
(i) causing the processor to execute the instructions to simultaneously change the fifth display range; and
(ii) causing the processor to execute the instructions to cause the first display range to remain unchanged.

39. The method of claim 36, which includes:
(a) causing the processor to execute the instructions to set the first image as a first translucent image, the first image having a first portion;
(b) causing the processor to execute the instructions to set the third image as a second translucent image, the third image having a second portion; and
(c) causing the processor to execute the instructions to operate with the display device to simultaneously display the first portion and the second portion such that the first portion and the second portion can each be visually identified.

40. A non-transitory computer-readable medium storing instructions structured to cause an information processing apparatus to:
(a) display a first image associated with a first observation target object, the first image having a first display range;

(b) display a second image associated with a second observation target object, the second image having a second display range;
(c) enable a user to change the first display range;
(d) in response to the first display range being changed, simultaneously change the second display range;
(e) for the displayed first image, enable the user to set first control points;
(f) for the displayed second image, enable the user to set second control points, wherein the second control points correspond to the first control points; and
(g) cause a first shape of the first control points to coincide with a second shape of the second control points by performing affine transformation.

* * * * *